US012768527B2

(12) United States Patent
De Samber et al.

(10) Patent No.: US 12,768,527 B2
(45) Date of Patent: Oct. 20, 2026

(54) LIGHTING SYSTEM FOR ILLUMINATING A TARGET SURFACE IN AN AGRICULTURAL ENVIRONMENT

(71) Applicant: SIGNIFY HOLDING B.V., Eindhoven (NL)

(72) Inventors: Marc Andre De Samber, Lommel (BE); Harry Broers, 'S-Hertogenbosch (NL); Aaron Benjamin Stephan, Chanhassen, MN (US); Joshua Michael John Muonio, Eindhoven (NL); Erica Bongers, Eindhoven (NL); Evren Özcan, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/422,237

(22) Filed: Jan. 25, 2024

(65) Prior Publication Data

US 2025/0243997 A1 Jul. 31, 2025

(51) Int. Cl.
*F21V 23/00* (2015.01)
*A01K 39/012* (2006.01)
(Continued)

(52) U.S. Cl.
CPC ........ *F21V 23/001* (2013.01); *A01K 39/0125* (2013.01); *A01K 39/0213* (2013.01);
(Continued)

(58) Field of Classification Search
CPC ....... F21V 23/001; H05B 45/14; H05B 45/24; A01K 39/0125; A01K 39/0213
See application file for complete search history.

(56) References Cited

U.S. PATENT DOCUMENTS

2010/0294205 A1* 11/2010 Kakimi .................. A01K 45/00 362/253
2011/0175551 A1* 7/2011 Wood ..................... A61B 90/30 315/307

(Continued)

FOREIGN PATENT DOCUMENTS

WO 2023180098 A1 9/2023

*Primary Examiner* — Abdulmajeed Aziz
*Assistant Examiner* — Jessica M Apenteng

(57) ABSTRACT

The invention provides lighting system for illuminating a target surface in an agricultural environment for a flock of birds, wherein the lighting system comprises a plurality of lighting devices spaced apart on an elongated axis, wherein each lighting device comprises: a connector for electrically connecting the lighting device to a power line; a housing comprising a light exit window; at least one solid-state light source arranged within the housing, wherein the at least one solid-state light source is configured to emit light source light; wherein each lighting device is configured to shape the light source light into a light beam, and configured to emit the light beam along a main optical axis via the light exit window onto the target surface; wherein adjacent lighting devices of the plurality of lighting devices are spaced apart with a spacing (S); and wherein the light exit windows of the adjacent lighting devices are arranged at a distance (H) from the target surface; wherein each respective light beam of the adjacent lighting devices has an angular light distribution with a Full Width Half Maximum (FWHM); wherein $$FWHM < F * 2 * \tan^{-1}\left(\frac{S}{2H}\right);$$

(Continued)

wherein FWHM is said Full Width Half Maximum (FWHM); wherein S is said spacing (S); wherein H is said distance (H); and wherein F is a factor in the range between 0.1 and 1.

18 Claims, 7 Drawing Sheets

(51) Int. Cl.

| | |
|---|---|
| ***A01K 39/02*** | (2006.01) |
| ***F21V 21/005*** | (2006.01) |
| ***F21W 131/40*** | (2006.01) |
| ***F21Y 115/10*** | (2016.01) |
| ***H05B 45/14*** | (2020.01) |
| ***H05B 45/24*** | (2020.01) |

(52) U.S. Cl.

CPC ........... *F21V 21/005* (2013.01); *H05B 45/14* (2020.01); *H05B 45/24* (2020.01); *F21W 2131/40* (2013.01); *F21Y 2115/10* (2016.08)

(56) References Cited

U.S. PATENT DOCUMENTS

| | | | | |
|---|---|---|---|---|
| 2012/0327645 | A1* | 12/2012 | You | F21S 9/04 362/192 |
| 2016/0123564 | A1* | 5/2016 | Quilici | F21V 23/003 362/233 |
| 2017/0171949 | A1* | 6/2017 | Kim | H05B 47/105 |
| 2019/0223386 | A1* | 7/2019 | Limpert | A01G 7/02 |
| 2021/0307298 | A1 | 10/2021 | McNaughton et al. | |

* cited by examiner

LIGHTING SYSTEM FOR ILLUMINATING A TARGET SURFACE IN AN AGRICULTURAL ENVIRONMENT

FIELD OF THE INVENTION

The invention relates to a lighting system for illuminating a target surface in an agricultural environment for a flock of birds, wherein the lighting system comprises a plurality of lighting devices. The invention further relates to a lighting arrangement comprising such lighting system(s). The invention further relates to a method of illuminating a target surface in an agricultural environment for a flock of birds. The invention further relates to an agricultural environment comprising such lighting system(s) and/or arrangements.

BACKGROUND OF THE INVENTION

Broiler chickens are grown for their meat. Broiler production has become more industrialized in modern communities, so as to achieve economically viable production of food at relatively low-price levels. For example, a newly hatched chick weighing 40 grams is grown to a bird weighing 5 kilograms within about eight weeks. It is also highly desired that the grown broiler chickens have a uniform size and weight at harvest and processing.

Therefore, similar to other chicken, broiler chickens are typically grown in artificial lighting conditions, that for example entrains a circadian rhythm of the birds (i.e. periods of light and periods of dark within a 24-hour cycle). During the periods of light the birds feed and drink. During the periods of dark the birds rest and digest. Another example of artificial lighting conditions in a poultry barn is that—during the periods of light—uniform lighting is provided throughout the poultry barn, such that all birds (of the flock of birds) are exposed to the same lighting conditions during their growth cycle, which has been thought to promote uniformity in size and weight.

Next to optimizing production, the topic of animal health and wellbeing is also getting more and more traction within modern poultry farming. It is for example found that improved animal health and wellbeing—for example reducing stress in chicken—has a positive outcome on e.g. the meat produced from broiler chicken. It also improves efficiency in growth and improved health.

Even though the aforementioned implementation of artificial lighting optimizes broiler production as such, it is nowadays desired to use artificial lighting to promote animal health and wellbeing as well, while still facilitating an economics of scale and maintaining an optimized production efficiency. Hence, there is a clear need to establish new illumination concepts in poultry farming.

SUMMARY OF THE INVENTION

It is an object of the invention to provide an improved lighting system, which at least alleviates the problems and disadvantages mentioned above, and provides a new concept of illuminating a poultry farm.

Thereto, the invention provides a lighting system for illuminating a target surface in an agricultural environment for a flock of birds, wherein the lighting system comprises a plurality of lighting devices spaced apart on an elongated axis, wherein each lighting device comprises: a connector for electrically connecting the lighting device to a power line; a housing comprising a light exit window; at least one solid-state light source arranged within the housing, wherein the at least one solid-state light source is configured to emit light source light; wherein each lighting device is configured to shape the light source light into a light beam, and configured to emit the light beam along a main optical axis via the light exit window onto the target surface; wherein adjacent lighting devices of the plurality of lighting devices are spaced apart with a spacing (S); and wherein the light exit windows of the adjacent lighting devices are arranged at a distance (H) from the target surface; wherein each respective light beam of the adjacent lighting devices has an angular light distribution with a Full Width Half Maximum (FWHM); wherein $$FWHM < F * 2 * \tan^{-1}\left(\frac{S}{2H}\right);$$

wherein FWHM is said Full Width Half Maximum (FWHM); wherein S is said spacing (S); wherein H is said distance (H); and wherein F is a factor in the range between 0.1 and 1.

The present invention provides an improved lighting system for illuminating a target surface in an agricultural environment. The agricultural environment is suitable for rearing a flock of birds. Said flock of birds may alternatively be phrased as poultry. Here, the flock of birds may be a flock of chicken or turkeys, for example a flock of broiler chicken. Said agricultural environment may be a poultry farm or barn. Said target surface may for example be a (farm) floor or platform (on which the flock of birds can reside).

The lighting system according to the invention comprises a plurality of lighting devices that are spaced apart on (or: along) an elongated axis. The elongated axis may be virtual. The elongated axis may alternatively be phrased as an axis of elongation, or (elongated) central axis.

Each lighting device comprises a connector for electrically connecting the lighting device to a power line, a housing comprising a light exit window, and at least one solid-state light source arranged within the housing. Hence, the plurality of lighting devices may be interconnected via the power line. The plurality of lighting devices may for example be daisy chained. The at least one solid-state light source is configured to emit light source light. Each lighting device is configured to shape the light source light into a light beam, and configured to emit the light beam along a main optical axis via the light exit window onto the target surface.

In aspects, the elongated axis and the main optical axis of each respective lighting device of the plurality of lighting devices may be arranged within a same plane. Said same plane may be parallel to the gravitational direction. In other embodiments, the main optical axis may be skewed relative to the gravitational direction, for example at an angle of at most 30 degrees relative to the gravitational direction.

The invention is further characterized in that adjacent lighting devices of the plurality of lighting devices are spaced apart with a spacing, S. The adjacent lighting devices, and in particular the light exit windows of the adjacent lighting devices, are arranged at a distance, H, from the target surface. Each respective light beam of the adjacent lighting devices has an angular light distribution with a Full Width Half Maximum, FWHM. According to the invention:

$$FWHM < F * 2 * \tan^{-1}\left(\frac{S}{2H}\right).$$

Thereby, F is a factor in the range between 0.1 and 1; S is said spacing; H is said distance.

As a result of this condition $$-FWHM < F*2*\tan^{-1}\left(\frac{S}{2H}\right)-$$

the plurality of lighting devices that are spaced apart on the elongated axis will render a non-uniform (non-homogenous, "dappled") light distribution on the target surface, rendering zones of lower intensity light in between adjacent lighting devices. This is completely opposite to the common practice to use uniform (homogenous) lighting in broiler production.

Namely: The inventors of the present application recognize first that farm animals ought to be kept in an environment that meets their behavioral needs, because being able to perform natural behavior is essential for animal welfare. However, performing natural behavior should not limit production efficiency. The inventors recognize further that the red junglefowl from South-East Asia is the wild ancestor of domestic chicken. The natural habitat of said red junglefowl are the edges of rainforest, where sunlight dynamically penetrates through the jungle canopy, and causes a patchwork of dappled light, wherein the light intensity is not uniform (homogenous). Hence, the lighting system according to the present invention provides a non-uniform light distribution on the target surface, with high intensity light spots and lower light intensity zones therebetween, wherein broiler chickens are provided with the opportunity to exhibit a preference (for ambient conditions), and thereby improve animal welfare.

Tests with the lighting system according to the invention have demonstrated that the non-uniform (non-homogenous) light distribution on the target surface, as caused by the spaced apart plurality of lighting devices, enriches the birds environment, and stimulates their cognitive behavior, because the birds are provided with a possibility to explore different ambient conditions and express a preference. For example, some birds are found to express the natural behavior of eating or dustbathing in bright spots created by the light beams according to the invention, while other birds prefer to eat and rest in less bright zones at the periphery of said spots or therebetween. For example, the birds are also found to move more due to their curious nature, thereby training their locomotion. This leads to more animal health and wellbeing, while the animals maintain feeding and growing.

Phrased differently, throughout the application, the lighting system according to the invention may be adapted to illuminate a target surface in an agricultural environment for a flock of birds. Said birds being for example chicken or turkeys. In an embodiment, said chicken are preferably broiler chicken.

In embodiments, the main optical axis of adjacent lighting devices may be parallel to one another. In embodiments, the main optical axis may be directed in the gravitational direction. In embodiments, the Full Width Half Maximum (FWHM) may be at most 115 degrees, such as for example at most 100 degrees.

In embodiments, the plurality of lighting devices may be at least three lighting devices. In embodiments, the plurality of lighting devices may be at least ten lighting devices. In embodiments, the plurality of lighting devices may be controlled individually to emit their respective light beam. In an embodiment, each lighting device may comprise a connector for mechanically, adhesively and/or magnetically connecting the lighting device to a support line.

In an embodiment, the factor (F) may be in the range between 0.1 and 0.8. In a further embodiment, the factor (F) may be in the range between 0.4 and 0.75. In yet a further embodiment, the factor (F) may be in the range between 0.1 and 0.3. With such ranges, the lighting system according to the invention renders a light intensity distribution on the target surface that further expands the zones with minimum light intensity in between adjacent lighting devices. This leads to more distinct variation in illumination and enriches the target surface even more for the flock of birds. Moreover, by lowering the factor F, a more collimated beam with a stronger cutoff is established, which delineates and differentiates illuminated and less illuminated zones in the agricultural environment even more.

In an embodiment, said spacing (S) may be at least 50 centimetres and at most 400 centimetres, preferably between 200 centimetres and 300 centimetres.

As mentioned, the adjacent lighting devices, and in particular the light exit windows of the adjacent lighting devices, are arranged at a distance, H, from the target surface of the agricultural environment. In an embodiment, the present invention is further characterized in that said distance (H) may be at most 1 meter. In a preferred embodiment, said distance may be at most 80 centimetres. For example, said distance may be between 40 and 55 centimeters. Such distances (or: height relative to the target surface) represent the typical height of different birds during their growth cycle. The birds may for example be chicks, roosters, hens, broilers, etc. The maximum height of at most 1 meter may be suitable for the typically full-grown height (or size) of a bird, such as a chicken or turkey.

Such embodiments are advantageous, because the lighting devices are positioned relatively close to the target surface, and thereby close to the flock of birds residing on the target surface. Namely, first, this results in a higher intensity light spot close to the flock of birds, and thereby a stronger enrichment effect on the birds. Second, considering the dimensions of a commercial poultry farm, which typically has a flock of ten-thousands of birds, it is clear that the lighting devices according to the present invention are not suited to homogenously illuminate the poultry farm, when arranged at most 1 meter from the target surface, but provide enrichment locally and have less light spillage. Light spillage may for example be caused by unnecessary illuminating sidewalls and/or the space above the flock of birds, where no chicken is present. For example, it is found that the lighting system according to the present invention renders up to 80% of energy savings compared to modem LED lighting systems mounted at a ceiling of a poultry farm. Third, the lighting system according to the invention can be installed, serviced, or replaced more easily, due to the distance (H) being at most 1 meter.

Hence, the lighting system according to the present invention generates a specific light intensity profile (or: light intensity distribution) on the target surface. This light intensity profile (or: light intensity distribution) comprises zones with maximum light intensity on the target surface, for example at the center of the light beams, and zones of minimum light intensity on the target surface, for example in between two light adjacent beams. Such a light intensity profile (or: light intensity distribution) may be advantageous for animal health and wellbeing, while maintaining the production efficiency of rearing a flock of birds of a commercial poultry farm.

More specifically, in an embodiment, the lighting system may be configured to generate a light intensity profile on the target surface along a line parallel to the elongated axis; wherein said light intensity profile comprises a repetitive distribution of a local maximum in light intensity between two local minima in light intensity; wherein the light intensity of the two local minima is at most 10% of the light intensity of the local maximum. The lighting system adapted to generate said light intensity profile in the agricultural environment and on said target surface is advantageous, because the light intensity profile renders a significant gradient between the maxima and minima in light intensity, which is at least a factor ten, which provides the birds more differentiated opportunities to express a preference.

In a related embodiment, the local maximum in light intensity is at least 100 lux, preferably at least 200 lux. In a related embodiment, said at least two local minima in light intensity are at most 30 lux. In a further related embodiment, said at least two local minima in light intensity are between 20 lux and 30 lux. The latter embodiment may be advantageous, because a minimum ambient light intensity level of 20 lux is maintained on the target surface, which meets mandatory light intensity levels for poultry production in the European Union. In jurisdictions with other regulations, the two local minima in light intensity may for example be zero or at most 20 lux.

The position of plurality of lighting devices (and their respective light exit windows) relative to the target surface may be adjusted in a direction perpendicular to the target surface, for example in the gravitational direction upwards. Hence, in an embodiment, said distance (H) may be adjustable from a first distance (H1) to a second distance (H2) in a direction perpendicular to the target surface.

Thus, in an embodiment, said distance (H) may be adjustable from a first distance (H1) to a second distance (H2). More specifically, in an embodiment, the lighting system may be configured to adjust the position of the plurality of lighting devices relative to the target surface in a direction perpendicular to the target surface.

In an embodiment, the lighting system may be configured to automatically, gradually, or continuously adjust the position of the plurality of lighting devices relative to the target surface in a direction perpendicular to the target surface. Such dynamically adjustable height of the plurality of lighting devices may be advantageous to maintain an optimal height of the lighting devices while the birds are growing, namely that the lighting devices always remain located above the birds and prevent possible glare. The lighting system may for example comprise known mechanical means for lifting, and thereby adjusting the height of the plurality of lighting devices. Said mechanical means may for example be a height adjustable support line onto which the lighting devices are mounted.

For example, the plurality of lighting devices of the lighting system according to the invention may (be adapted to) be mounted on a support line in the agricultural environment, such as a feeding line, a watering line, or a shocker wire. Because a feeding line, and/or a watering line, and/or a shocker wire may increase in height relative to the floor of a poultry farm while the a flock of birds grow in the poultry farm, which is a typical and default implementation in poultry farming, any lighting devices mounted to said feeding line, watering line, and/or shocker wire may be adjusted (increase or decrease) in distance relative to the floor (i.e. the target surface) of the poultry farm (i.e. the agricultural environment) as well.

Hence, in an embodiment, said distance (H) may be adjustable from a first distance (H1) during a first stage of a growth cycle of the flock of birds to a second distance (H2) at a second stage of a growth cycle of the flock of birds.

In a related embodiment, the second distance (H2) is larger than the first distance (H1), wherein the second stage of the growth cycle of the flock of birds is later in time than the first stage of the growth cycle of the flock of birds.

In an embodiment, said distance (H) may be adjustable from a first distance (H1) to a second distance (H2), wherein lighting device may further comprise an optical element configured to shape said light source light along the main optical axis, when moved from the first distance (H2) to the second distance (H2), into respectively a first light beam when at the first distance (H1) and a second light beam when at the second distance (H2), wherein a footprint of the first light beam on the target surface and a footprint of the second light beam on the target surface remains the same.

As mentioned, the lighting system according to the invention is configured to illuminate a target surface in an agricultural environment that is suitable for (rearing) a flock of birds. The lighting system comprises a plurality of lighting devices. The plurality of lighting devices may be controlled individually or as a group.

Considering individual control: In an embodiment, each lighting device of the plurality of lighting devices may comprise a local controller configured to control a light intensity, a Correlated Color Temperature (CCT), light beam distribution, and/or a spectral distribution of the light source light of the respective lighting device.

In a related embodiment, the local controller is configured to obtain a control command (comprising instructions) for controlling the at least one solid-state light source of the respective lighting device, wherein the local controller is configured to control a light intensity, a Correlated Color Temperature (CCT) and/or a spectral distribution of the light source light of the respective lighting device based on said control command.

In a related embodiment, each lighting device of the plurality of lighting devices comprises a communication unit, wherein the communication unit is configured to receive a control command (comprising instructions) for controlling the at least one solid-state light source of the respective lighting device. Said communication unit may comprise a receiver, transmitter and/or transceiver.

Hence, in embodiments, each lighting device of the plurality of lighting devices may comprise a local controller and a communication unit; wherein the communication unit is configured to receive a control command for controlling the at least one solid-state light source of the respective lighting device; wherein the local controller is configured to obtain said control command and to control a light intensity, a Correlated Color Temperature (CCT) and/or a spectral distribution of the light source light of the respective lighting device based on said control command.

In a related embodiment, said communication unit may be configured to wirelessly receive said control command. For example, the communication unit may comprise a receiver (or transceiver) configured to receive said control command wirelessly. This may for example be via known wireless communication modalities, such as radiofrequency, Bluetooth, ZigBee, Wi-Fi, Lo-Ra, Matter, Thread, Visible Light Communication, IR, etc.

Alternatively, in an embodiment, the communication unit may be configured to receive said control command via wired communication. The communication unit may comprise a receiver (or transceiver) configured to receive said control command via a wired communication network. This may for example be via known wired communication modalities, such as Ethernet, Power over Ethernet, Power Line Communication, Coded Mains, Pulse Width Modulation, etc.

Considering group control: In an embodiment, the lighting system comprises a lighting controller; wherein the lighting controller is configured to control a light intensity, a Correlated Color Temperature (CCT) and/or a spectral distribution of the light source light of the plurality of lighting devices. The lighting controller may be housed within one lighting device of the plurality of lighting devices. This lighting device may be the master lighting device. In other examples, the lighting controller may be separate from the plurality of lighting devices, for example remote from the plurality of lighting devices and operatively coupled therewith via a wireless or wired communication network.

In an embodiment, the communication unit is configured to convey a device signal (from the respective lighting device) to a further apparatus.

In an embodiment, at least one lighting device of the plurality of lighting devices comprises a sensor and/or a communication unit; wherein the sensor is configured to detect a signal indicative of a bird-related parameter of the flock of birds and/or a flock-related parameter of the flock of birds; wherein the communication unit is configured to convey the detected signal to a further apparatus. Said communication unit may comprise a transmitter and/or transceiver. For example, the sensor may be a temperature sensor, a light sensor, a presence sensor, a PIR sensor, a thermopile array, a VOC sensor, a Time-of-Flight sensor, a camera, an accelerometer, a pressure sensor, a radiofrequency sensing sensor, a LIDAR, a humidity sensor, a CO2 sensor, an ammonia sensor, a particle matter sensor, a microphone, a microphone array, a RADAR sensor, radiofrequency-based sensing sensor, etc.

In an embodiment, the plurality of lighting devices of the lighting system are individually controlled to turn on subsequently in time. The controller according to the invention, and/or the local controller according to the invention, may perform said individually turning on feature. For example, the controller and/or local controller may store a predetermined turning on schedule that is configured to turn on the plurality of lighting devices subsequently in time, and control the plurality of lighting devices according to said turning on schedule. This turning on may occur gradually. Turning on may alternatively be turning off or dimming. For example, a first lighting device may be controlled to turn on first at a fist time, a second lighting device may be controlled to turn on next at a second time, a third lighting device may be controlled to turn on next at a third time, a fourth lighting device may be controlled to turn on next at a fourth time, and so on. This enables that in time more (zones) of the target surface of the agricultural environment may be enriched. In aspects, the plurality of lighting devices of the lighting system are individually controlled based on the growth stage of the flock of birds. This enables that in time more (zones) of the target surface of the agricultural environment may be enriched, as more space in the agricultural environment is required for rearing the growing flock of birds. Similar control strategies may be envisioned. For example, a lighting system according to the invention may comprise a controller and/or a local controller configured to control the respective at least one solid-state light source based on a predetermined light schedule (or: light scene), wherein the predetermined light schedule causes the plurality of lighting devices to turn on subsequently in time, or to turn off subsequently in time, or to dim subsequently in time, or to turn on alternately in time, or to pseudo-randomly turn on in time. Such examples may render even more enrichment.

In an embodiment, the lighting system may facilitate radiofrequency-based sensing. Namely, a set of lighting devices of the plurality of lighting devices comprises a transceiver for wireless communication within a wireless communication network, wherein each lighting device of the set of lighting devices is configured to exchange wireless communication signals with at least one other lighting device of the set of lighting devices within said wireless communication network. Hence, in other words, at least one transmitting lighting device of the set of lighting devices exchanges wireless communication signals with at least one receiving lighting device of the set of lighting devices. The lighting system according to this embodiment of the invention further comprises a (radiofrequency-based sensing) controller configured to obtain (receive or retrieve) communication data comprising (or indicative of) said wireless communication signals, and configured to determine a parameter of the flock of birds based on said communication data. Namely, the (radiofrequency-based sensing) controller is configured to determine the parameter of the flock of birds based on said communication data by measuring a change of a signal property of the wireless communication signals resulting from an interference of the set of animals with said wireless communication signals. Such radiofrequency-based sensing enables to determine various parameters of the flock of birds. For example, the parameter of the flock of birds comprises at least one of: a presence of the flock of birds in a first zone of the target surface of the agricultural environment; a displacement of the flock of birds from a first zone of the target surface of the agricultural environment to a second zone of the target surface of the agricultural environment; a direction of movement of flock of birds; an increment in average biomass of the flock of birds; an increment in average size of the flock of birds; an activity indicator of the flock of birds; a sleep-awake state of the flock of birds; an amount of motion of the flock of birds; a flock of birds density; clustering indicator of the flock of birds, etc. Such an embodiment is particularly advantageous, because the distance (H) of the plurality of lighting devices (and their light exit window) is relatively small (i.e. the lighting devices are very close to the target surface) to enable said non-uniform light distribution on the target surface, such that radiofrequency-based sensing would be possible with the plurality of lighting devices according to the invention, as these are spaced apart along the elongated axis. In related embodiments, the controller may be part of at least one lighting device of the set of lighting devices, e.g. as a local controller or a distributed controller. Said wireless communication network may be a wireless lighting network.

According to the invention, each lighting device of the plurality of lighting devices shapes the light source light (of the at least one solid-state light source) into a light beam and emits said light beam along a main optical axis via the light exit window onto the target surface.

The light source light may comprise at least one lighting characteristic. Such a lighting characteristic may for example be one or more of: a light intensity, light color, light correlated color temperature, a light beam distribution, spectral distribution, polarity and modulation. While the lighting system according to the invention provides environmental enrichment, and thereby animal health and wellbeing, by controlling the lighting characteristic of the emitted light source light the behaviour of the flock of birds may additionally be controlled, so as to render even more health and wellbeing.

In an embodiment, each respective light beam is configured to render a respective spot of light on the target surface; wherein a lux level in the respective spot of light on the target surface is within the range of 20 lux to 400 lux. For example, the lux level in the respective spot of light on the target surface may be within the range of 100 lux to 400 lux.

In an embodiment, each respective light beam comprises a light intensity; wherein said light intensity is at least 150 lumens. Such light intensities are favorable for growing a flock of chicken.

In an embodiment, the emitted light source light comprises white light. Such embodiments may be advantageous, as white light resembles daylight, or natural light. Hence, in an embodiment, the emitted light source light comprises a Correlated Color Temperature (CCT) between 2500 and 6500 Kelvin, preferably between 4500 and 5500 Kelvin. In an embodiment, the emitted light source light comprises a Color Rendering Index (CRI) of at least 80, preferably a Color Rendering Index (CRI) of at least 90.

In an embodiment, the emitted light source light comprises at least one dominant peak wavelength within the wavelength range between 380-800 nm.

More specifically, in an embodiment, the emitted light source light comprises at least one dominant peak wavelength within the wavelength range between 380-500 nm. Such wavelengths may be advantageous, as blue light may relieve stress in chicken and promote growth.

More specifically, in an embodiment, the emitted light source light comprises at least one dominant peak wavelength within the wavelength range between 620-750 nm. More specifically, the emitted light source light comprises at least one dominant peak wavelength within the wavelength range between 700-750 nm. Such wavelength range represents far-red light. These red wavelengths may be advantageous, as red light may promote chicken eating, drinking and being active. Red light may also calm chicken, reduce indicators of stress, and/or promote sexual maturity.

Moreover, for photoreceptors in the chicken brain to be activated, light must penetrate through the many layers of feathers, skin, and bone to reach the brain. Light wavelengths in the red portion of the light spectrum can most effectively penetrate through tissues to reach non-visual photoreceptors in the brain. It is for example known that red light may penetrate the skull of chicken. Hence, red light is particularly suitable to control chicken behavior. Therefore the present embodiment may be advantageous, as the lighting system according to the invention does not only render a light intensity profile that promotes bird health and wellbeing based on environmental enrichment, but also enables to control bird behavior with the respective light beams (and associated spots of light on the target surface).

In an embodiment, the emitted light source light comprises at least one dominant peak wavelength within the wavelength range between 750-1000 nm. Such wavelength range represents near infrared red light (NIR). In an embodiment, the emitted light source light comprises infrared light. Such embodiments may be advantageous to enable said environmental enrichment. Namely, said infrared light may boost the natural sensation of warmth in the higher light intensity spots that the light beams according to the invention create on the target surface. This mimics a sunny spot in nature, allowing the birds to exhibit their natural behavior in an artificially created, but more natural, environment—thereby promoting animal health and wellbeing.

More specifically, in an embodiment, the emitted light source light comprises ultraviolet light, preferably ultraviolet light with at least one dominant peak wavelength in the wavelength range between 315-380 nm, and/or ultraviolet light with at least one dominant peak wavelength in the wavelength range between 280-315 nm, and/or ultraviolet light with at least one dominant peak wavelength in the wavelength range between 100-280 nm. Such wavelengths may be advantageous, because the visual response of chicken may observe ultraviolet light, and ultraviolet light may therefore provide visibility for conspecifics without affecting their circadian rhythm. Ultraviolet light may also provide disinfection and vitamin D generation. Therefore, as the lighting system according to the invention does not only render a light intensity profile that promotes bird health and wellbeing based on environmental enrichment, it also enables to control bird behavior with the respective light beams and e.g. vitamin D therapy. Such ultraviolet light may enrich the target surface even more for the flock of chicken, and benefit health and wellbeing of said flock.

In an embodiment, the emitted light source light comprises at least one dominant peak wavelength within the wavelength range between 450-480 nm and a dominant peak at a wavelength range between 515-545 nm. Such wavelengths may relate to the trademarked and patented ONCE by Signify Junglite light recipe, which is a light recipe specifically tailored to promote health and wellbeing of poultry.

In an embodiment, a first lighting device of the plurality of lighting devices emits light source light having a first lighting characteristic, and a second lighting device of the plurality of lighting devices emits light source light having a second lighting characteristic, wherein the first lighting characteristic and the second light characteristic are different.

In an embodiment, the first lighting characteristic may comprise ultraviolet light. In an embodiment, the first lighting characteristic may comprise infrared light. In an embodiment, the second lighting characteristic may comprise white light. In an embodiment, the first lighting characteristic may comprise blue light.

Hence, adjacent lighting devices may emit respective light source light having different lighting characteristics. For example, adjacent lighting devices may emit light source light at different intensities, at different colors, and/or at different correlated color temperatures.

In an embodiment, the plurality of lighting devices of the lighting system may be controlled temporally. Namely, during a first time period, the plurality of lighting devices of the lighting system according to the invention may be controlled to emit a first lighting characteristic, and during a second time period the plurality of lighting devices of the lighting system according to the invention may be controlled to emit a second lighting characteristic. The first time period may be a first period within the growth cycle of the flock of birds. The second time period may be a second period within the growth cycle of the flock of birds. For example, the flock of birds may be provided a first light recipe with a first spectrum of light during a first number days of growth, and a second light recipe with a second spectrum of light during a next number of days of growth. Such numbers may be envisioned accordingly, as different breeds of birds may require different temporal light schedules. For example the first number of days may be seven, whereas said next number of days may be fourteen. Hence, in examples, the lighting system according to the invention controls the plurality of lighting devices with a changing light spectrum over time.

In an embodiment, the plurality of lighting devices of the lighting system may be controlled spatially. Namely, during a first time period, a first set of the plurality of lighting devices of the lighting system according to the invention may be controlled to emit a lighting characteristic, and during a second time period a second set plurality of lighting devices of the lighting system according to the invention may be controlled to emit a lighting characteristic. Said lighting characteristic may be the same or different for each respective set of lighting devices and time periods. The first time period may be a first period within the growth cycle of the flock of birds. The second time period may be a second period within the growth cycle of the flock of birds.

As mentioned, the present invention provides a lighting system for illuminating a target surface in an agricultural environment for a flock of birds. The lighting system comprises the plurality of lighting devices spaced apart on an elongated axis. It may be beneficial to mount the plurality of lighting devices on the elongated axis above and along an existing feeding line (or: feed line), or watering line (or: water line) in the agricultural environment. However, the feed line or water line itself may cause an undesired shade on the target surface where a beam of light is desired.

Therefore, the lighting system according to the invention is provided, wherein the light exit window of each respective lighting device may comprise a contour in a plane parallel to the elongated axis, wherein the contour comprises a geometric centre; wherein the at least one solid-state light source comprises a first array of solid-state light sources and a second array of solid-state light sources; wherein first array of solid-state light sources and the second array of solid-state light sources are arranged around said geometric centre. Such an embodiment is advantageous, because the first array of solid-state light sources and the second array of solid-state light sources are arranged around said geometric centre, thereby providing two separate sources of light that are able to compensate for shades caused by an obtruding object and rendered by the other light source. This effect is further improved by positioning the arrays of solid-state light sources closer to the contour (or perimeter) of the light exit window.

Hence, in a related embodiment, the first array of solid-state light sources and the second array of solid-state light sources are arranged concentrically around said geometric centre. Hence, in a related embodiment, wherein the first array of solid-state light sources is arranged opposite to the second array of solid-state light sources. Hence, in a related embodiment, the first array of solid-state light sources and the second array of solid-state light sources are arranged closer to said contour than the geometric centre.

Hence, in certain embodiments, the light exit window of each respective lighting device comprises a contour in a plane parallel to the elongated axis, wherein the contour comprises a geometric centre; wherein the at least one solid-state light source comprises a first array of solid-state light sources and a second array of solid-state light sources; wherein first array of solid-state light sources and the second array of solid-state light sources are arranged around said geometric centre; wherein the first array of solid-state light sources is arranged opposite to the second array of solid-state light sources; wherein the first array of solid-state light sources and the second array of solid-state light sources are arranged closer to said contour than to the geometric centre.

In a different embodiment, the lighting system according to the invention is provided, wherein the each respective lighting device may comprise a first light source and a second light source, wherein the first light source may emit a first light source light having a first lighting characteristic, wherein the second light source may emit a second light source light having a second lighting characteristic, wherein the first lighting characteristic and the second lighting characteristic are different, wherein the lighting device is configured to shape the first light source light into a first light beam and to shape the second light source light into a second light beam. For example, said lighting characteristic may comprise at least one of: a light intensity, light color, correlated color temperature (CCT), a light beam distribution, spectral distribution, polarity, and modulation. For example, the first light source may emit the first light source light having white light, and the lighting device may shape the white light into a first light beam and emit said first light beam. The second light source may (simultaneously) emit the second light source light having UVB light, and the lighting device may shape the UVB light into a second light beam and emit said second light beam. The first light beam and the second light beam may have a different beam angle. In all cases, the beam angle of the emitted light beam meets the FWHM condition according to the invention.

In an embodiment, the at least one solid-state light source may be at least one Light Emitting Diode (LED), such as for example an array of LEDs. The LEDs may be arranged on a PCB, a Metal Core PCB, or a flex PCB. Such PCBs may be planar or curved.

In a related embodiment, the at least one solid-state light source may be at least one LED filament. Such LED filaments may be cost-effective, thereby contributing the overall production efficiency of a poultry farm, while the lighting system of which these are part improves animal health and wellbeing. Moreover, LED filaments may be more attractive for animals such as a flock of birds to look into, (especially when located very close to the target surface where the flock of birds reside and/or are reared), thereby enriching the environment even further, and enabling an additional feature to attract the curiosity of the flock of birds.

In an embodiment, each lighting device comprises an optical element configured to shape said light source light along the main optical axis into the light beam.

In a related embodiment, the optical element comprises adaptive optics configured to manually and/or automatically adapting the Full Width Half Maximum of the respective light beam.

In a related embodiment, the optical element comprises a collimator and/or a lens, wherein the collimator and/or the lens is configured to collimate said light source light along the main optical axis into the light beam.

In a related embodiment, the optical element comprises a filter and/or a mask, wherein the filter and/or the mask is configured to filter and/or mask at least part of said light source light along the main optical axis into the light beam.

In an embodiment, the optical element is a lens adapted to render a batwing distribution, such that the light beam according to the invention has a batwing distribution of light. Such embodiments may be advantageous for lighting devices mounted above a feeding line or a watering line (i.e. drinking line). Hence, the light exit window according to the invention may shape the light source light into a batwing-shaped light beam.

In an embodiment, a cross-section of each respective light beam is rotationally symmetric. In a related embodiment, the cross-section of each respective light beam is circular. In an embodiment, the light exit window is a planar light exit window.

In an embodiment, each lighting device is configured to emit the light beam on only one side of the elongated axis. In related embodiments, a first lighting device of the adjacent lighting devices emits its respective light beam on only a first side of the elongated axis, wherein a second lighting device of the adjacent lighting devices emits its respective light beam on only a second side of the elongated axis, wherein the first side is opposite to the second side. Such embodiments may render more (local) enrichment and enable more granular control of the illuminated and not illuminated parts of the target surface.

In an embodiment, each lighting device may comprise a second light exit window, wherein each lighting device is configured to shape the light source light into a second (ambient) light beam, and configured to emit the second (ambient) light beam along a second main optical axis via the second light exit window into the agricultural environment. In aspects, the main optical axis and the second main optical axis may be substantially perpendicular, or at an angle relative to one another. Hence, the light exit window and the second light exit window may be opposite to one another in the housing. In alternative aspects, the main optical axis and the second main optical axis may be the same but pointing in opposite directions.

In an embodiment, the connector comprises a connector head and an extension cord, wherein the connector head is configured to electrically connect the lighting device to a power line, wherein the connector head is separate and remote from the housing, wherein the extension cord is connected to the connector head, wherein the extension cord connects to the housing and conveys power to the solid-state light source.

In an embodiment, at least one lighting device of the plurality of lighting devices comprises a power outlet, wherein the power outlet is configured to connect to an auxiliary powerline and configured to convey auxiliary power to the auxiliary powerline. This enables a lighting module(s) to be connected to the at least one lighting devices according to the invention, for example to provide local lighting conditions (hence: improved enrichment) within the agricultural environment. Such a lighting module may for example provide module light. Said module light may be ultraviolet light or infrared light. Said ultraviolet light may for example be UVB light. Since UVB light is suitable for vitamin therapy for a flock of birds, but the feather pack of the flock of birds may be less suitable to receive said UVB light compared to the feet, the lighting module(s) that can tap into the power outlet of the at least one lighting device according to the invention may be advantageous to bring local light at the target surface, or: at floor level. Said infrared light may provide heat therapy, or render drying the bedding of a floor in the agricultural environment. In aspects, said power outlet comprises a patch for closing said power outlet. This provides ingress protection. The lighting system according to the invention may, in aspects, also include the lighting module(s) as mentioned above. Such lighting modules may comprise an extended auxiliary powerline configured to connect to the power outlet of the at least one lighting device according to the invention. The lighting module may comprise a module light source configured to emit said module light. The module light may be emitted along a main optical axis that points away from the target surface. The power outlet may also serve to power sensors and actuators in the agricultural environment, or other powerlines powering lighting systems according to the invention. The latter enables splitting, or branching of a lighting system according to the invention into a second lighting system according to the invention.

It is further an object of the invention to provide an improved lighting arrangement for illuminating a target surface in an agricultural environment for a flock of birds, which at least alleviates the problems and disadvantages mentioned above. Thereto, the invention provides a lighting arrangement for illuminating a target surface in an agricultural environment for a flock of birds, wherein the lighting arrangement comprises: (i) a first lighting system according to the invention; wherein the first lighting system is configured to generate a light intensity profile on the target surface along a line parallel to the elongated axis; wherein said light intensity profile comprises a repetitive distribution of a local maximum in light intensity between two local minima in light intensity; wherein the light intensity of the two local minima is at most 10% of the light intensity of the local maximum. (ii) at least one luminaire for illuminating the target surface in the agricultural environment with luminaire light in operation, wherein said luminaire light renders a lux level of least 20 lux on the target surface; AND/OR (iii) a plurality of nutrient dispensers configured to release a nutrient to the flock of birds, wherein the plurality of nutrient dispensers is arranged substantially parallel to the elongated axis of the first lighting system, wherein a respective nutrient dispenser of the plurality of nutrient dispensers is arranged respectively between the adjacent lighting devices of the first lighting system. Thereby, advantages and/or embodiments applying to the lighting system according to the invention may mutatis mutandis apply to said lighting arrangement according to the invention.

In an embodiment, a respective nutrient dispenser of the plurality of nutrient dispensers is arranged respectively at the center of the spacing (S) between the adjacent lighting devices of the first lighting system.

In an embodiment, a respective nutrient dispenser of the plurality of nutrient dispensers is arranged respectively within a length (L) from (the optical axis of the respective) lighting device of the adjacent lighting devices of the first lighting system, wherein said length L is equal to a quarter of the spacing (S).

In an embodiment, the plurality of nutrient dispensers comprises at least one feeding pan and/or at least one drinking nipple.

In an embodiment, the lighting arrangement comprises: (iv) a support line; wherein each lighting device of the first lighting system comprises a mechanical connector for mechanically connecting the lighting device to the support line. In a related embodiment, the support line is a shocker wire for chicken. In a related embodiment, the support line is a feedline for chicken.

In an embodiment, the lighting arrangement comprises: (iv) a height adjustable support line; wherein each lighting device of the first lighting system comprises a mechanical connector for mechanically connecting the lighting device to the support line; wherein the position of the plurality of lighting devices relative to the target surface is adjustable in a direction perpendicular to the target surface.

For example, the first lighting system, due to the lighting devices being mechanically connected to the height adjustable support line, is configured to adjust the position of the plurality of lighting devices relative to the target surface in a direction perpendicular to the target surface. The support line may be adjustable in height by known means. For example, a feeding line for conveying feed to chicken is typically adjustable in height to accommodate for chicken growing during their growth cycle, or to prevent hens eating feed designated for roosters. Hence, height adjustable feed lines and water lines (drinking lines, or drinking nipples) are common in poultry farms. Since the lighting system is now connected to these types of support lines, the lighting devices thereof may also be advantageously adjustable in height. As mentioned before, the adjacent lighting devices, and in particular the light exit windows of the adjacent lighting devices, are arranged at a distance, H, from the target surface of the agricultural environment, wherein said distance (H) may preferably be at most 1 meter.

In a related embodiment, the height adjustable support line is a shocker wire for chicken. In a related embodiment, the height adjustable support line is a feedline for chicken. In a related embodiment, the height adjustable support line is a power line for chicken. Alternatively, the height adjustable support line may be another wire spun in the agricultural environment. Alternatively, the height adjustable support line may be bar of a platform or a porch.

In an embodiment, the lighting arrangement comprises: (v) a second lighting system according to the invention; wherein the second lighting system is configured to generate a light intensity profile on the target surface along a line parallel to the elongated axis; wherein said light intensity profile comprises a repetitive distribution of a local maximum in light intensity between two local minima in light intensity; wherein the light intensity of the two local minima is at most 10% of the light intensity of the local maximum.

In one embodiment, the elongated axis of the first lighting system is parallel to the elongated axis of the second lighting system; wherein the elongated axis of the first lighting system is at a pitch length (P) from the elongated axis of the second lighting system. Said pitch length may for example be at least 50 centimeters, preferably at least 1 meter.

In another embodiment, the elongated axis of the first lighting system is perpendicular to the elongated axis of the second lighting system.

In another embodiment, the elongated axis of the first lighting system and the elongated axis of the second lighting system are at an angle (A).

In an embodiment, the first lighting system and the second lighting system are powered separately. Powered separately may mean powered over a different, separate, power line. However, these separate power lines may both tap into the same main power line. In a different embodiment, the first lighting system and the second lighting system are powered simultaneously.

In an embodiment, the distance (H1) of the first lighting system may be different to the distance (H2) of the second lighting system. For example, the first lighting system may be installed at a higher distance from the target surface than the second lighting system. This may be the case when the first lighting system is installed on a different type of nutrient dispenser than the second lighting system.

In an embodiment, the spacing of the first lighting system may be different from the spacing of the second lighting system. In an embodiment, the spacing of the first lighting system and the spacing of the second lighting system are arranged such that the plurality of lighting devices of the first lighting system and the plurality of lighting devices of the second lighting system are arranged in a checkerboard pattern when their respective elongated axes are parallel and adjacent.

In an embodiment, the first lighting system and the second lighting system are controlled separately. In a different embodiment, the first lighting system and the second lighting system are controlled simultaneously (e.g. as a group).

In an embodiment, the first lighting system and the second lighting system are powered alternately in time. In an embodiment, the first lighting system and the second lighting system are powered subsequently in time.

In an embodiment, the lighting arrangement comprises: (vi) a plurality of second nutrient dispensers configured to release a nutrient to the flock of birds, wherein the plurality of second nutrient dispensers is arranged parallel to the elongated axis of the second lighting system, wherein a respective second nutrient dispenser of the plurality of second nutrient dispensers is arranged respectively between the adjacent lighting devices of the second lighting system; wherein the plurality of nutrient dispensers comprises at least one feeding pan; wherein the plurality of second nutrient dispensers comprises at least one drinking nipple.

In an embodiment, the lighting arrangement according to the invention further comprises an arrangement controller configured to control one or more of: the first lighting system, the second lighting system, the plurality of nutrient dispensers, the plurality of second nutrient dispenser, and the (height adjustable) support line. In aspects, the arrangement controller is configured to control the first lighting system and the second lighting system are controlled individually. For example, the first lighting system and the second lighting system may be subsequently controlled by the arrangement controller. In aspects, the arrangement controller is configured to control the first lighting system and the second lighting system are controlled simultaneously as a group. In aspects, the arrangement controller is configured to control the height of the support line (according to the limitations of the present invention, wherein the condition $$FWHM < F * 2 * \tan^{-1}\left(\frac{S}{2H}\right)$$

is always met.

It is further an object of the invention to provide an improved method of illuminating a target surface in an agricultural environment for a flock of birds, which at least alleviates the problems and disadvantages mentioned above. Thereto, the invention provides a method of illuminating a target surface in an agricultural environment for a flock of birds, performed by a lighting system comprising a plurality of lighting devices, wherein each lighting device comprises: a connector for electrically connecting the lighting device to a power line; a housing comprising a light exit window; at least one solid-state light source arranged within the housing, wherein the at least one solid-state light source is configured to emit light source light; wherein each respective light beam of the adjacent lighting devices has an angular light distribution with a Full Width Half Maximum (FWHM); wherein the method comprises: spacing apart adjacent lighting devices of the plurality of lighting devices on an elongated axis with a spacing (S); arranging the light exit windows of the adjacent lighting devices at a distance (H) from the target surface; each one of the adjacent lighting devices shaping the light source light into a light beam and emitting the light beam along a main optical axis via the light exit window onto the target surface; wherein $$FWHM < F * 2 * \tan^{-1}\left(\frac{S}{2H}\right);$$

wherein FWHM is said Full Width Half Maximum (FWHM); wherein S is said spacing (S); wherein H is said distance (H); and wherein F is a factor in the range between 0.1 and 1. Thereby, advantages and/or embodiments applying to the lighting system and lighting arrangement according to the invention may mutatis mutandis apply to said method according to the invention.

In an embodiment, the method comprises: electrically connecting the lighting devices to a power line. In an embodiment, the method comprises: mechanically connecting the lighting devices to a support line.

In an embodiment, the method comprises: generating a light intensity profile on the target surface along a line parallel to the elongated axis; wherein said light intensity profile comprises a repetitive distribution of a local maximum in light intensity between two local minima in light intensity; wherein the light intensity of the two local minima is at most 10% of the light intensity of the local maximum.

It is further an object of the invention to provide an improved use of a lighting system and/or a lighting arrangement according to the invention, which at least alleviates the problems and disadvantages mentioned above. Thereto, the invention provides the use of a lighting system and/or a lighting arrangement according to the invention within an agricultural environment for rearing a flock of birds (in particular a flock of chicken, such as broiler chicken).

The invention further provides an agricultural environment comprising at least one lighting system according to the present invention, or at least one lighting arrangement according to the present invention.

In aspects, the invention provides, a lighting arrangement for illuminating a target surface in an agricultural environment for a flock of birds, wherein the lighting arrangement comprises (i) a feedline configured to convey feed to a feeding location within the agricultural environment; (ii) a lighting system comprising plurality of lighting devices spaced apart on an elongated axis on the feedline, wherein the plurality of lighting devices are mechanically and/or magnetically mounted to the feedline; wherein each lighting device comprises: a connector for electrically connecting the lighting device to a power line; a housing comprising a light exit window; at least one solid-state light source arranged within the housing, wherein the at least one solid-state light source is configured to emit light source light; wherein each lighting device is configured to shape the light source light into a light beam, and configured to emit the light beam along a main optical axis via the light exit window onto the target surface; wherein adjacent lighting devices of the plurality of lighting devices are spaced apart with a spacing (S), and wherein the light exit windows of the adjacent lighting devices or the elongated axis are arranged at a distance (H) from the target surface; wherein each respective light beam of the adjacent lighting devices has an angular light distribution with a Full Width Half Maximum (FWHM); wherein $$FWHM < F * 2 * \tan^{-1}\left(\frac{S}{2H}\right);$$

wherein FWHM is said Full Width Half Maximum (FWHM); wherein S is said spacing (S); wherein H is said distance (H); and wherein F is a factor in the range between 0.1 and 1

In aspects, the invention further provides a lighting device according to the invention, and the use of said lighting device according to the invention in a lighting system according to the invention.

In aspects, the invention provides an illumination system for illuminating a target surface within an agricultural environment suitable for rearing a flock of birds, wherein the lighting system comprises a control unit and a plurality of lighting devices interconnected via a power line and arranged on an elongated axis, wherein each lighting device of the plurality of lighting devices comprises a light source configured to emit a respective light beam having a respective lighting characteristic (e.g. in a direction perpendicular to the elongated axis); wherein the control unit is in communication with said lighting devices and is configured to control the lighting devices to emit the respective light beam, wherein the respective light beams of the plurality of lighting devices do not overlap at the target surface, (or wherein the plurality of lighting devices are spaced on the elongated axis such that the respective light beams do not overlap at the target surface). Thereby, advantages and/or embodiments applying to the lighting system and lighting arrangement according to the invention may mutatis mutandis apply to said illumination system according to the invention.

The control unit may individually and/or simultaneously control the lighting devices to emit the respective light beam. The control unit may group control the lighting devices to emit the respective light beam. The control unit may alternately (in time), sequentially (in time), or simultaneously (in time) control the lighting devices to emit the respective light beam.

In aspects, the lighting characteristic of each respective light beam of the plurality of lighting devices may be the same. In aspects, the lighting characteristic of each respective light beam of the plurality of lighting devices may be different.

For example, said lighting characteristic may comprise a light intensity, such as 200 lux. For example, said lighting characteristic may comprise a light spectrum. Said spectrum may for example be white light. Said spectrum may for example comprises at least one dominant peak wavelength within the wavelength range between 380-500 nm. Said spectrum may for example comprises at least one dominant peak wavelength within the wavelength range between 620-750 nm. Said spectrum may for example comprises at least one dominant peak wavelength within the wavelength range between 750-1000 nm. This may be far-red, near infrared, or infrared light. Said spectrum may for example comprises at least one dominant peak wavelength within the wavelength range between 200-415 nm. This may be ultraviolet and/or violet light. Said spectrum may for example be UVA, UVB, or UVC light.

BRIEF DESCRIPTION OF THE DRAWINGS

The invention will now be further elucidated by means of the schematic non-limiting drawings.

DETAILED DESCRIPTION OF THE EMBODIMENTS

The invention will be described with reference to the Figures.

The use of artificial light in commercial poultry barns is well known in the art. The artificial light is used to grow a flock of chicken. By providing more hours of artificial light compared to dark during the 24-hour circadian cycle of the birds, the flock of chicken is mainly stimulated to feed and drink. This results in faster growing birds and quickly increased muscle sizes, but may also lead to problems related to bird locomotion and stress, thereby affecting animal health and welfare.

Said artificial light is provided uniformly, because uniform lighting exposes all birds of the flock of birds to the same lighting conditions during their growth cycle, which is thought to promote the uniformity in size and weight. Such uniformity is a performance criteria for poultry farmers.

Therefore, commercial poultry stables are typically equipped with ceiling-mounted luminaires, so as to illuminate large surfaces of the poultry barn with the least (necessary) number of luminaires required (i.e. to reduce installation and maintenance cost). These ceiling-mounted luminaires are positioned such that their respective light beams overlap, and cause uniform illumination throughout the poultry barn (i.e. e.g. a uniform light intensity distribution on the floor or bedding of the poultry barn).

Figure 1:
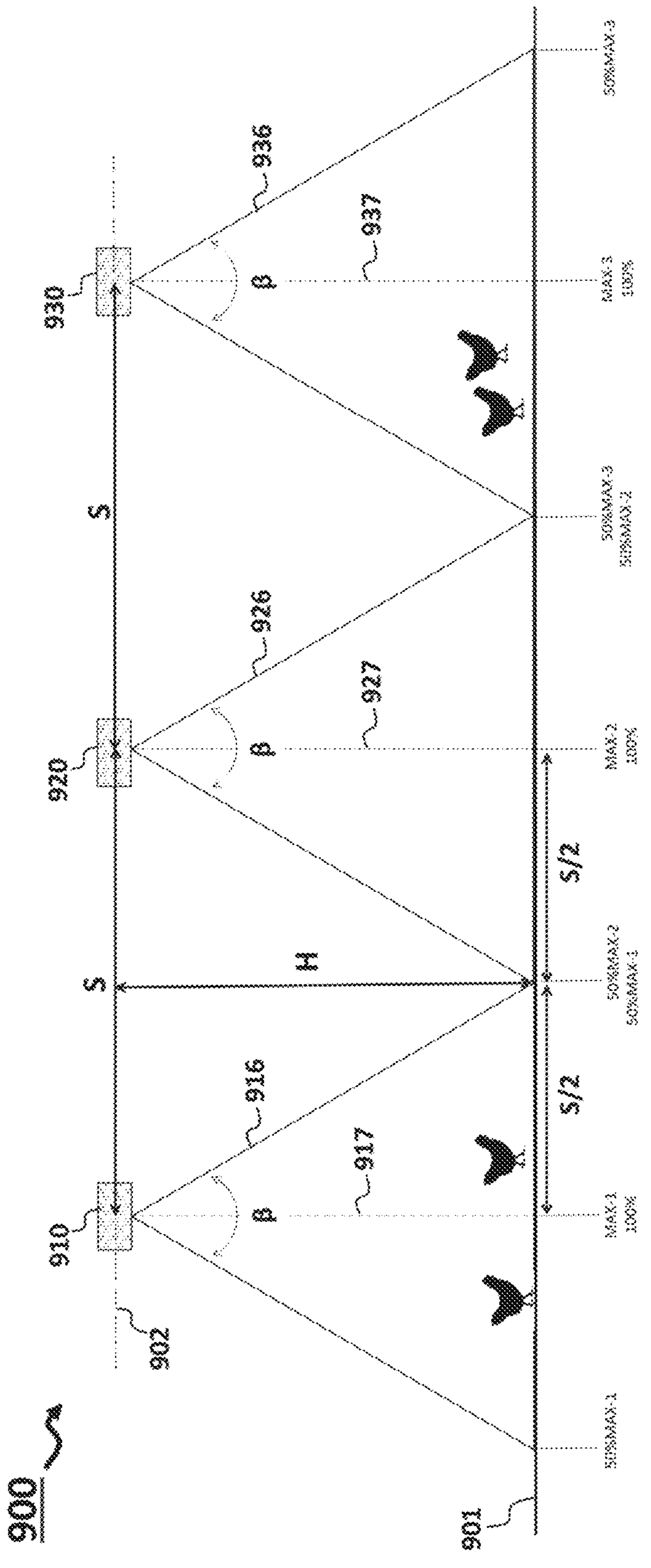
FIG. 1 depicts schematically, for explanatory purposes, a lighting system.

FIG. 1 depicts schematically, for explanatory purposes only, a cross-sectional side-view of a lighting system 900, wherein a target surface 901 is illuminated with substantially uniform lighting. The target surface 901 may for example be the floor of the poultry barn. Said lighting system 900 comprises a first lighting device 910, a second lighting device 920, and a third lighting device 930. These lighting devices 910, 920, 930 are the same, but located (or: positioned) separately in the poultry barn. Each of these lighting devices emits a light beam 916, 926, 936 having an angular light distribution with a Full Width Half Maximum (FWHM). Each of said lighting devices is thereby considered to be a point source of light, emitting light along a main optical axis 917, 927, 937 respectively. Said FWHM may alternatively be phrased as a beam angle (p). Said Full Width Half Maximum, or beam angle, is denoted with Greek letter 3 in FIG. 1.

The first lighting device 910, the second lighting device 920, and the third lighting device 930 are spaced apart with a distance S. The first lighting device 910 is adjacent to the second lighting device 920. The second lighting device 920 is adjacent to the third lighting device 930. Thus, FIG. 1 depicts that adjacent lighting devices are spaced apart with said distance S. Moreover, the first lighting device 910, the second lighting device 920, and the third lighting device 930 are all arranged at a distance H from the target surface. As mentioned, each of said lighting devices 910, 920, 930 is thereby considered to be a point source of light, emitting light along a main optical axis 917, 927, 937 respectively.

Still referring to the situation depicted in FIG. 1, as presently depicted, the target surface 901 is illuminated with substantially uniform lighting. This is achieved by the light beams of the adjacent lighting devices—defined by their FWHM—intersecting (or at least partly overlap) on the target surface 901. This arrangement renders uniform lighting at the target surface, because two light beams having half of maximum light intensity intersect (or overlap), and thereby render a maximum intensity at intersect (or at overlap). Hence, to achieve even and uniform lighting on a target surface, as can be derived from FIG. 1, the condition of $$FWHM \geq 2 * \tan^{-1}\left(\frac{S}{2H}\right)$$

should apply. The FWHM is thereby said Full Width Half Maximum (FWHM), also denoted with beam angle R in FIG. 1. The variable S is said spacing between adjacent lighting devices. The variable H is said distance H between the lighting devices 910, 920, 930 and the target surface 901.

Even though uniform lighting has proven benefits to e.g. broiler production, it appears that uniform lighting is too dull to chicken, which are curious and explorative animals by nature. Uniform lighting may enable a regular and consistent feed intake, but appears to demote locomotion and movement, which subsequently leads to reduced health and wellbeing of the chicken. Since animal health and wellbeing is getting more and more attention nowadays, and also becomes an important topic for new regulations, it is desired to improve animal health and wellbeing, while maintaining an optimized production efficiency. This is done with new illumination concepts in poultry farming, that are opposite to the proven traditional concept of uniform lighting in the poultry barn.

The present invention provides an improved lighting system, lighting arrangement, and method of illuminating, which provide a new concept of illuminating a poultry farm.

Figure 2:
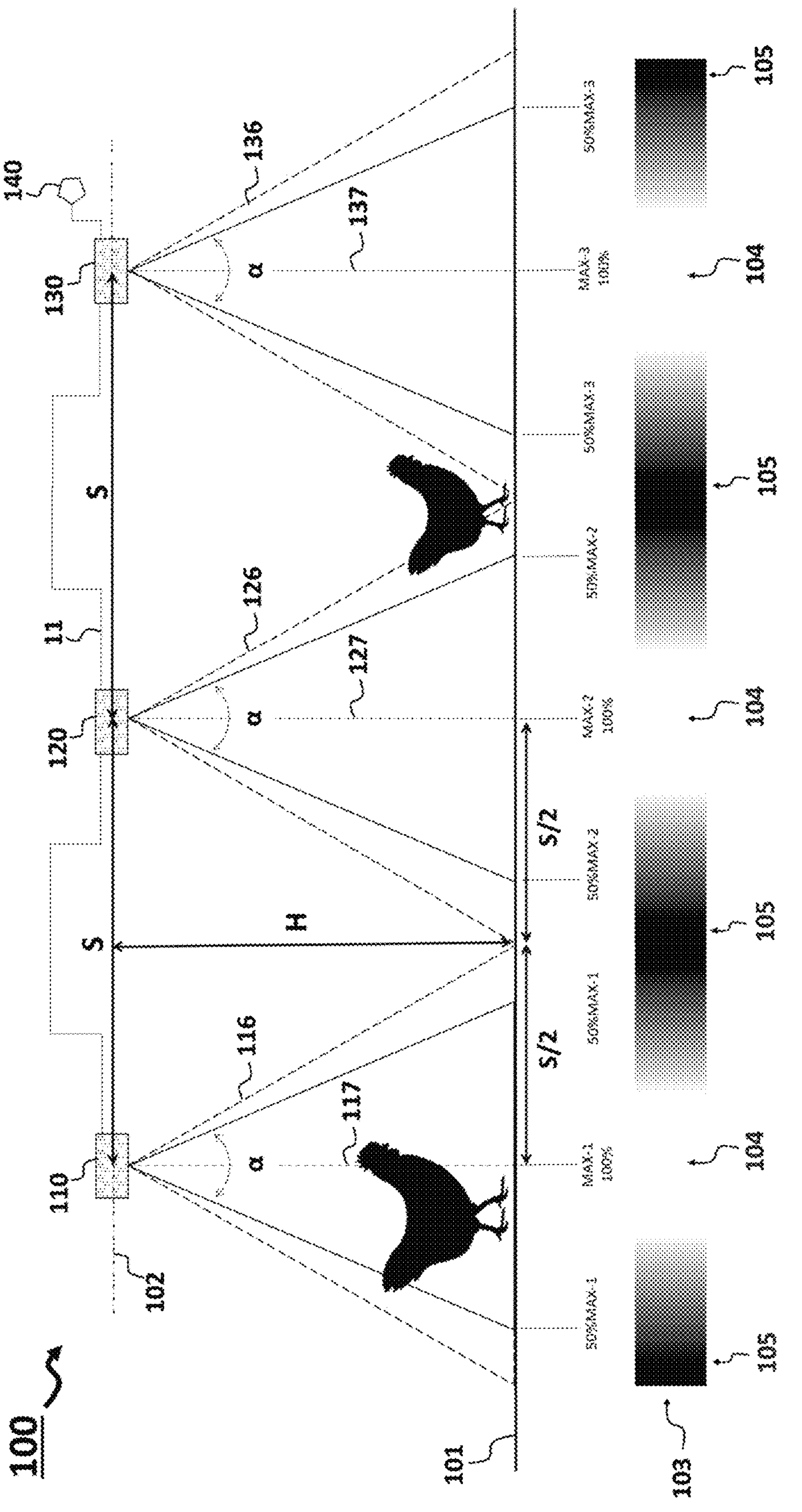
FIG. 2 depicts schematically an embodiment of a lighting system according to the invention.

FIG. 2 depicts schematically, by non-limiting example, a cross-sectional side-view of an embodiment of a lighting system 100 according to the invention. The lighting system 100 illuminates a target surface 101 in an agricultural environment that is suitable for rearing a flock of birds. Said flock of birds may for example be a flock of chicken or flock of turkeys. Said agricultural environment may for example be an indoor agricultural environment. Said agricultural environment may for example be a poultry barn. Hence, the flock of birds may reside and walk on the target surface 101. The target surface 101 may for example be the floor of a poultry barn, or a platform.

Said lighting system 100 comprises a plurality of lighting devices 110, 120, 130. Each lighting device 110, 120, 130 is the same, but located (or: positioned) separately in the agricultural environment. Namely, the plurality of lighting devices 110, 120, 130 are spaced apart on an elongated axis 102 with a spacing S. Said plurality of lighting devices may thereby be any integer number of lighting devices. The lighting system 100 may for example comprise at least ten lighting devices. However, for illustrative purposes, the lighting system 100 of the embodiment depicted in FIG. 2 comprises a number of three lighting devices 110, 120, 130.

Namely, referring to FIG. 2, the lighting system 100 comprises a first lighting device 110, a second lighting device 120, and a third lighting device 130. The first lighting device 110 and the second lighting device 120 are adjacent.

The second lighting device 120 and the third lighting device 130 are adjacent. The adjacent lighting devices are spaced apart with said spacing S. Said spacing may be fixed. In the present embodiment, said spacing is 250 centimeters, but may alternatively be at least 50 centimeters and at most 400 centimeters.

Figure 3:
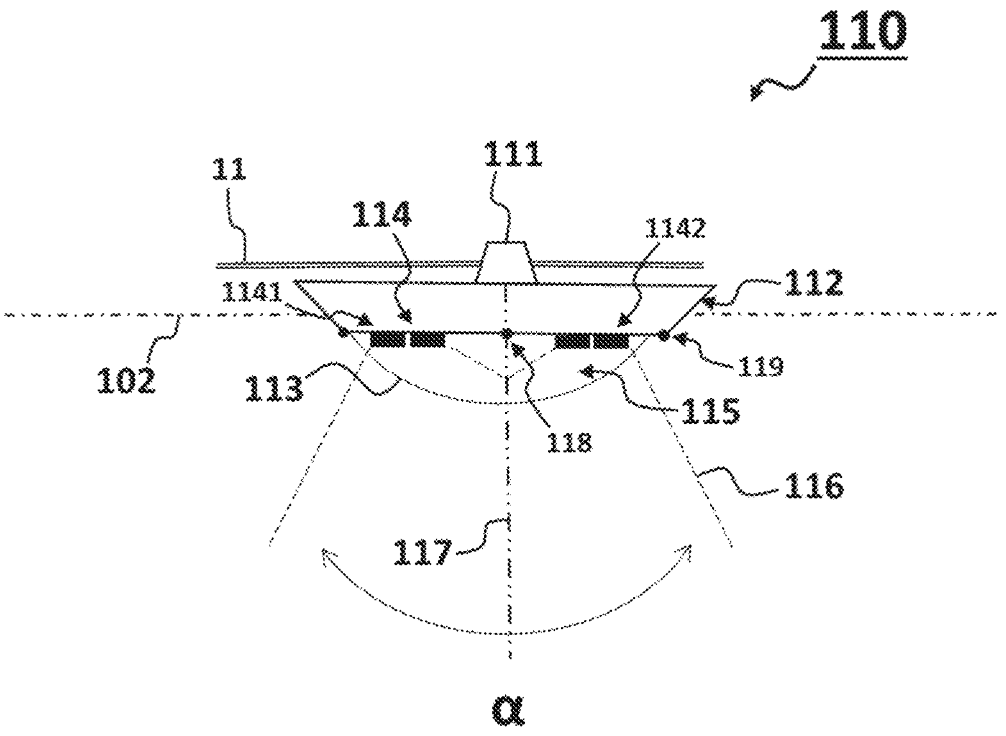
FIG. 3 depicts schematically an embodiment of a lighting device according to the invention.

As mentioned, in the embodiment depicted in FIG. 2, each lighting device 110, 120, 130 of the plurality of lighting devices is the same. FIG. 3 depicts schematically, by non-limiting example, such a lighting device 110 according to the invention. Such a lighting device 110 comprises a connector 111, a housing 112 comprising a light exit window 113, and at least one solid-state light source 114.

Alternatively, the plurality of lighting devices is not the same, and different types of lighting devices may be present in the plurality of lighting devices, i.e. having different hardware components and functionalities.

Referring to FIG. 2 and FIG. 3, said connector 111 is configured to connect the lighting device 110 to a power line 11. Hence, the plurality of lighting devices 110, 120, 130 are located (or: positioned) separately in the agricultural environment, but the plurality of lighting devices may be interconnected via the power line. The lighting devices 110, 120, 130 may for example be daisy chained. The power line 11 powers the respective lighting devices in operation. The power line may cause the plurality of lighting devices to turn on or off, or dim. The power line may additionally or alternatively provide control commands to the respective lighting devices in operation, via e.g. power line communication. Alternatively, the lighting devices may be connected to a wired data line, or be part of a wireless communication network.

The at least one solid-state light source 114 is arranged within the housing 112. The at least one solid-state light source 114 is configured to emit light source light 115 in operation. The at least one solid-state light source may be at least one Light Emitting Diode (LED).

The at least one solid-state light source may alternatively be a laser light source. The light beam according to the invention may consequently be a laser light beam. In aspects, such a laser light beam may optionally be a dynamic light beam. Hence, each lighting device of the plurality of lighting devices may emit a laser light beam.

In embodiments, the at least one solid-state light source may comprise an array of at least one type of LED. For example, the LED may be a warm-white LED, a cold-white LED, a red LED, a Blue LED, a green LED, an ultraviolet LED, an amber LED, etc. Here, the light source light 115 is white light, but may alternatively emit any other suitable spectrum of light mentioned in the present application.

For example, in alternative embodiments, said light source light may comprise at least one dominant peak wavelength within the wavelength range between 380-500 nm (i.e. blue light), and/or between 625-750 nm (i.e. red light), and/or between 750-1000 nm (i.e. NIR light), and/or between 315-380 nm (i.e. UV-A light), and/or between 280-315 nm (UV-B light), and/or between 200-280 nm (i.e. UV-C light), and/or between 380-415 nm (i.e. violet light), and/or between 450-480 nm and 515-545 nm (i.e. corresponding to trademarked ONCE by Signify Junglite light spectrum).

Hence, as mentioned, in the present embodiment, the light source light 115 is white light. The white light comprises a Correlated Color Temperature (CCT) between 2500 and 6500 Kelvin, preferably between 4500 and 5500 Kelvin. The at least one solid-state light source 114 may for example be an array of LED light sources emitting white light.

The housing 112 comprises a light exit window 113. Each lighting device is configured to shape the light source light 115 into a light beam 116, and configured to emit the light beam 116 along a main optical axis 117 via the light exit window 113 onto the target surface 101. Here, the main optical axis 117 is directed in the gravitational direction (downward). In the present embodiment, the cross-section of the light beam 116 is rotationally symmetric and circular, but may alternatively comprise any other symmetric shape, such as square or elliptical.

In embodiments, albeit optional but still partly depicted in FIG. 3, the light exit window 113 of each respective lighting device 110 comprises a contour 119 in a plane parallel to the elongated axis 102. The contour comprises a geometric center 118. In the present embodiment, the geometric center corresponds to the point where the main optical axis 117 intersects said plane. The at least one solid-state light source comprises a first array of solid-state light sources 1141 (e.g. LEDs) and a second array of solid-state light sources 1142 (e.g. LEDs). The first array 1141 and second array 1142 of solid-state light sources are arranged concentrically around said geometric center 118 and opposite to one another. Moreover, the first array of solid-state light sources 1141 and the second array of solid-state light sources 1142 are arranged closer to said contour 119 than the geometric center 118. This may optimize the light distribution of the emitted light beam 116 on the target surface 101 in case of obtruding objects along the main optical axis 117. Other arrangements of solid-state light sources within the lighting device may be envisioned similarly. For example, the solid-state light sources may be arranged in an array within the respective lighting device, such as on a PCB or a Chip-on-Board.

Still referring to the lighting system 100 depicted in FIG. 2, each lighting device 110, 120, 130 of the plurality of lighting devices is the same. For illustrative purposes, each of said lighting devices 110, 120, 130 is considered to be a point source of light, wherein each lighting device 110, 120, 130 respectively emits light source light 115 in operation, and each lighting device 110, 120, 130 emits a respective light beam 116, 126, 136 along their respective main optical axis 117, 127, 137.

Moreover, in the present embodiment, albeit optionally, the plurality of lighting devices 110, 120, 130 are group controlled. Therefore, the lighting system 100 comprises a lighting controller 140. The lighting controller 140 is (located) separate from the plurality of lighting devices. Here, the lighting controller 140 is connected to the powerline 11. The lighting controller 140 is configured to control each lighting device 110, 120, 130. Here, all three lighting devices 110, 120, 130 are controlled simultaneously and as a group.

Alternatively, for example, the lighting controller 140 is configured to individually control each lighting device 110, 120, 130 of the plurality of lighting devices of the lighting system. Yet alternatively, the controller is configured to individually control—via for example the intermediary of a local controller in the respective lighting device—the at least one solid-state light source of a respective lighting device.

The lighting controller may therefore transmit, for example, lighting control commands to said lighting devices. Each lighting device may comprise a local controller (not depicted) or control circuit that obtains said lighting control commands, and controls the at least one light source to emit said light source light based on said lighting control commands. Hence, the lighting controller 140 is configured to control a light intensity (e.g. turn on, off, or dim), a Correlated Color Temperature (CCT) and/or a spectral distribution of the light source light 115 of the plurality of lighting devices 110, 120, 130.

Alternatively, the lighting controller may be connected to a wired network of the plurality of lighting devices. The wired network may for example be a data network, or data line(s). The lighting controller may control the plurality of lighting devices via said wire network and/or data line(s). Yet alternatively, the lighting controller may be configured to wirelessly control the plurality of lighting devices. Hence, the plurality of lighting devices and the lighting controller may comprise communication modules for wirelessly communicating with one another. For example, each lighting device may comprise a transceiver for wireless communication. Said wireless communication may for example be done via radiofrequency, Wi-Fi, ZigBee, Bluetooth, BLE Mesh, LTE, VLC, IR, etc. In alternative aspects, the lighting controller may be part of (or: housed within the housing of) one lighting device of the plurality of lighting devices, such as for example within a master lighting device which may control the other (slave) lighting devices.

Still referring to the lighting system 100 depicted in FIG. 2, each respective light beam 116, 126, 136 of the adjacent lighting devices has an angular light distribution with a Full Width Half Maximum (FWHM). Said FWHM may alternatively be phrased as a beam angle. The FWHM, or beam angle, is denoted with Greek letter α in FIG. 2.

As mentioned, the first lighting device 110 and the second lighting device 120 are adjacent. The second lighting device 120 and the third lighting device 130 are adjacent. The adjacent lighting devices are spaced apart with said spacing S of 250 centimeters.

Furthermore, the light exit windows of the adjacent lighting devices are arranged at a distance H from the target surface 101. Said distance H may alternatively be phrased as the height H from the target surface 101. In the present embodiment, said distance is 80 centimeters, but may alternatively be at most 100 centimeters, which is relatively close to the target surface 101 of the agricultural environment (e.g. poultry barn).

Still referring to FIG. 2, the lighting system 100 is further characterized in that the plurality of lighting devices 110, 120, 130 are arranged such that their Full Width Half Maximum (FWHM), or beam angle denoted with a, is smaller than $$F*2*\tan^{-1}\left(\frac{S}{2H}\right).$$

Hence, phrased differently, the condition $$FWHM < F*2*\tan^{-1}\left(\frac{S}{2H}\right)$$

applies. Thereby, F is a factor in the range between 0.1 (A TENTH) and 1 (ONE). The variable S is said spacing. The variable H is said distance from the target surface 101.

As a result of this condition $$-FWHM < F*2*\tan^{-1}\left(\frac{S}{2H}\right)-$$

the plurality of lighting devices 110, 120, 130 that are spaced apart on the elongated axis 102—with said spacing S and distance H from the target surface 101—will render a non-uniform (non-homogenous, dappled) light distribution on the target surface 101, with darker zones on the target surface 101 in between the adjacent lighting devices.

Namely, the lighting system according to the invention will render zones with maximum light intensity close to where the main optical axis 117, 127, 137 intersects the target surface 101, and render zones with minimum light intensity on the target surface 101 in between said adjacent lighting devices 110, 120, 130.

In the present embodiment, said factor F is set to 1 (ONE). Considering the above-mentioned spacing S of 250 centimeters and a distance H of 80 centimeters, the FWHM becomes 115 degrees. Hence, each lighting device 110, 120, 130 of the plurality of lighting devices comprises a FWHM (or beam angle α) below 115 degrees.

Said factor F may alternatively be set to 0.75 (THREE-FOURTHS). Considering the above-mentioned spacing S of 250 centimeters and a distance H of 80 centimeters, the FWHM then becomes 108 degrees. Hence, each lighting device of the plurality of lighting devices may then comprises a FWHM (or beam angle α) below 108 degrees.

Similarly, said factor F may alternatively be set to a value between 0.1 and 1. For example, said factor F may be in the range between 0.1 and 0.3. This will render a highly collimated beam with a strong cut-off in light intensity. Said factor F may be in the range between 0.4 and 0.75. Said factor F may alternatively be between 0.5 and 0.8.

All in all, the lighting system 100 according to the invention is opposite to the common practice in poultry stables to use uniform (homogenous) lighting, wherein it is aimed to illuminate large surfaces of the poultry barn with the least number of luminaires required (preferably with overlapping wide-angle luminaires).

Namely: The inventors of the present application recognize first that farm animals ought to be kept in an environment that meets their behavioral needs, because being able to perform natural behavior is essential for animal welfare. The inventors recognize further that the red junglefowl from South-East Asia is the wild ancestor of domestic chicken. The natural habitat of said red junglefowl are the edges of rainforest, where sunlight dynamically penetrates through the jungle canopy, and causes a patchwork of dappled light, wherein the light intensity is not uniform (homogenous). Hence, the lighting system 100 according to the present invention provides a non-uniform light distribution on the target surface 101, with high intensity light spots and lower intensity zones therebetween, wherein individual chickens of the flock of chicken are provided with the opportunity to exhibit a preference (for ambient conditions), and thereby improve animal welfare. At the same time, production efficiency of rearing the poultry is maintained, or even improved.

Tests with the lighting system 100 according to the invention have demonstrated that the non-uniform (non-homogenous) light distribution on the target surface 101, as caused by the spaced apart plurality of lighting devices 110,120, 130, enriches the birds environment, and stimulates their cognitive behavior, because the birds are provided with a possibility to explore different ambient conditions and express a preference. This leads to more animal health and wellbeing. For example, being able to express a preference for light intensity leads to less stress in chicken (i.e. some chicken like to reside in dimmed zones, while others like to reside in brighter zones). For example, it is found that birds tend to dustbathe more, and tend to move around more, due to the presence of localized high light intensity zones. This improves locomotion and reduces movement related health issues.

Still referring to FIG. 2, the lighting system 100 generates a specific light intensity profile 103 (or: light intensity distribution) on the target surface 101. More specifically, the lighting system 100 generates a light intensity profile 103 on the target surface 101 along a line parallel to the elongated axis 101. The light intensity profile 103 comprises a repetitive distribution of a local maximum 104 between two local minima 105 in light intensity. The light intensity of the two local minima 105 is at most 10% of the light intensity of the local maximum 104. Having at least a factor ten in light intensity between the local maximum and local minima is found to render sufficient differentiation and associated environmental enrichment to the flock of chicken.

Here, the local maximum in light intensity is 300 (TWO HUNDRED) lux at the target surface 101, and the two local minima in light intensity are at most 30 (THIRTY) lux on the target surface 101. Said local minima may for example be zero lux and twenty lux. Other values for lux levels may be envisioned similarly.

In alternative examples, particularly in jurisdictions regulated by the European Union, said at least two local minima in light intensity may be between the values of 20 lux and 30 lux on the target surface, because EU regulations demand that a minimum ambient light intensity level of 20 lux is maintained on the target surface for poultry production.

The present invention also renders further advantages. Considering that typical agricultural environments, such as poultry farms, have dimensions that are at least higher than a (human) farmer walking therethrough, it is clear that the lighting devices 110, 120, 130 of the lighting system 100 according to the invention are positioned relatively close to the target surface 101 when at a distance H of at most 1 meter, and in the present embodiment at a distance H from the target surface of 80 centimeters. This does not only result in inhomogeneous lighting in the agricultural environment and a plurality of local maxima in light intensity, and the associated benefits thereof in terms of environmental enrichment, as described above, but the plurality of lighting devices 110, 120, 130 are also easier to reach for installation, replacement, or servicing. Yet even further, the (unconventional and) relatively close positioning of the lighting devices 110, 120, 130 to the target surface 101 renders less light spillage caused by unnecessary illuminating volumes where the flock of birds cannot reside. It is found that the lighting system 100 according to the present invention renders up to 80% of energy savings compared to modem LED lighting systems mounted at a ceiling of a poultry farm, and results in more animal health and wellbeing, while maintaining (or even increases) the existing production efficiency.

Figure 4:
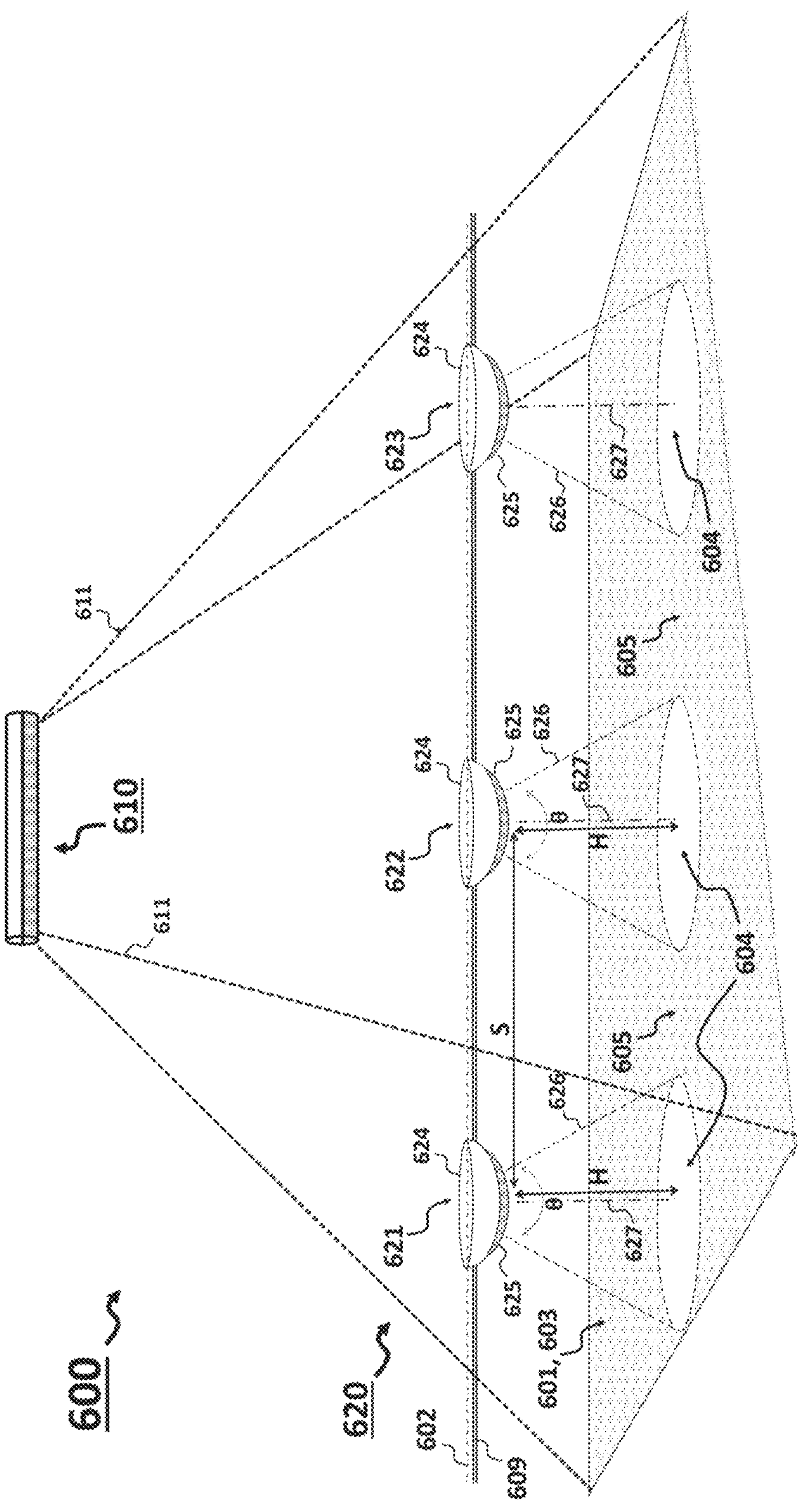
FIG. 4 depicts schematically an embodiment of a lighting arrangement according to the invention.

FIG. 4 depicts schematically, by non-limiting example, an embodiment of a lighting arrangement 600 according to the invention. The lighting arrangement 600 illuminates a target surface 601 in an agricultural environment. The agricultural environment may be an indoor agricultural environment, such as a poultry barn. The target surface 601 is arranged for a flock of birds. Said flock of birds may for example be a flock of chicken or turkey. The target surface 601 may be a floor or platform within the agricultural environment.

Referring to FIG. 4, the lighting arrangement 600 comprises a first lighting system 620 and at least one luminaire 610.

The luminaire 610 emits luminaire light 611 in operation. The luminaire 610 illuminates (at least part of) the target surface 601 of the agricultural environment. More specifically, the luminaire 610 renders a lux level of at least 20 lux on the target surface 601. Such lux levels are in accordance with EU regulations, that demand that a minimum ambient light intensity level of 20 lux is maintained on the target surface for poultry production.

Alternatively, said luminaire may render another lux level on the target surface, such as for example at most 30 lux on the target surface. Said luminaire light may alternatively be phrased as ambient light or ambient illumination. In aspects, said luminaire light may be uniformly distributed over the target surface, i.e. the luminaire light renders a uniform light intensity distribution on the target surface but at a lower intensity.

Referring to FIG. 4, the lighting arrangement 600 further comprises a first lighting system 620. The first lighting system 620 comprises a plurality of (the same) lighting devices 621, 622, 623 spaced apart on an elongated axis 602.

For convenience, FIG. 4 depicts only three lighting devices. Namely, the first lighting system 620 comprises a first lighting device 621, a second lighting device 622, and a third lighting device 623. The first lighting device 621 and the second lighting device 622 are adjacent (on the elongated axis 602). The second lighting device 622 and the third lighting device 623 are adjacent (on the elongated axis 602).

Still referring to FIG. 4, the adjacent lighting devices 621, 622, 623 are spaced apart with a spacing S (measured along the elongated axis 602). In the presently depicted embodiment, the spacing S is 200 centimeters, but may alternatively be at least 50 centimeters and at most 400 centimeters.

In other examples, the spacing S between adjacent lighting devices is not necessarily the same. For example, the spacing between a first lighting device and a second lighting device can be (a first spacing) different from a (second) spacing between the second lighting device and a third lighting device.

Each respective lighting device 621, 622, 623 of the plurality of lighting devices comprises a connector (not explicitly depicted), a housing 624 comprising a light exit window 625 and at least one solid-state light source such as a LED light source.

Alternatively, the plurality of lighting devices is not the same, and different types of lighting devices may be present in the plurality of lighting devices, i.e. having different hardware components and functionalities. For example, only one lighting device of the plurality of lighting devices may be different from the remaining lighting devices. For example, one lighting device may be a master lighting device (comprising additional functionalities in communication, sensing, processing and/or controlling) while the remaining lighting devices may be slave lighting devices being controlled by said master lighting device.

Still referring to FIG. 4, the connector of each lighting devices is configured to connect the lighting device to a power line 609. The power line 609 powers the plurality of lighting devices 621, 622, 623 in operation. The plurality of lighting devices 621, 622, 623 may furthermore be interconnected on the same power line. The power line may additionally or alternatively provide control commands to the respective lighting devices in operation, via e.g. power line communication. The power line may cause the plurality of lighting devices to turn on or off. Moreover, the connector (not explicitly depicted) mechanically connects the lighting device to a support line, which is in the present embodiment the power line 609 itself. However, in alternative embodiments, said support line may for example be a (height-adjustable) shocker wire.

The at least one light source of said lighting devices 621, 622, 623 is configured to emit light source light in operation. Here, the light source light is white light, but may alternatively emit any other suitable spectrum of light mentioned in the present application.

In an alternative embodiment, a first lighting device of the plurality of lighting devices emits light source light having a first lighting characteristic, and a second lighting device of the plurality of lighting devices emits light source light having a second lighting characteristic, wherein the first lighting characteristic and the second light characteristic are different. For example, the first lighting device of the embodiment depicted in FIG. 4 may emit (white light comprising) ultraviolet light or infrared light, whereas the other lighting devices (i.e. the second and the third lighting device) may solely emit white light. Such alternative embodiments may further improve enrichment of the agricultural environment.

Still referring to FIG. 4, each lighting device 621, 622, 623 is configured to shape the respective light source light into a light beam 626. The light beam 626 is emitted along a main optical axis 627 via the light exit window 625 onto the target surface 601. The light exit window 625 may in examples be a planar light exit window. Here, the main optical axis 627 is directed in the gravitational direction (downward).

In embodiments, not depicted, the at least one solid-state light source may comprise a first solid-state light source for emitting a first spectrum of light source light and a second solid-state light source emitting a second spectrum of light source light, wherein the first spectrum of light source light is shaped into a first light beam and the second spectrum of light source light is shaped into a second light beam, wherein the beam angle of the first light beam and the second light beam are different. For example, the lighting device may emit ultraviolet light source light at a broad angle and white light at a narrower angle (than the broad angle).

Still referring to FIG. 4, each respective light beam 626 of the adjacent lighting devices 621, 622, 623 has an angular light distribution with a Full Width Half Maximum (FWHM). Said FWHM may alternatively be phrased as a beam angle. The FWHM, or beam angle, is denoted with Greek letter θ in FIG. 4.

As mentioned, the first lighting device 621 and the second lighting device 622 are adjacent. The second lighting device 622 and the third lighting device 623 are adjacent. The adjacent lighting devices are spaced apart with said spacing S of 200 centimeters.

Furthermore, the light exit windows 625 of the adjacent lighting devices are arranged at a distance H from the target surface 601. Said distance H may alternatively be phrased as the height H from the target surface 601. In the present embodiment, said distance is 70 centimeters, but may alternatively be at most 100 centimeters, which is relatively close to the target surface 601 of the agricultural environment (e.g. poultry barn).

Still referring to FIG. 4, the lighting system 100 is further characterized in that the plurality of lighting devices 621, 622, 623 are arranged such that their Full Width Half Maximum (FWHM), or beam angle denoted with θ, meets the condition of FWHM $$FWHM < F * 2 * \tan^{-1}\left(\frac{S}{2H}\right).$$

Thereby, F is a factor in the range between 0.1 (A TENTH) and 1 (ONE). The variable S is said spacing. The variable H is said distance from the target surface 601.

In the present embodiment, said factor F is set to 0.5. Considering the above-mentioned spacing S of 200 centimeters and a distance H of 70 centimeters, the FWHM becomes 55 degrees. Hence, each lighting device 621, 622, 623 of the plurality of lighting devices comprises a FWHM (or beam angle θ) below 55 degrees.

Similarly, said factor F may alternatively be set to a value between 0.1 and 1. For example, said factor F may be in the range between 0.1 and 0.3. This will render a highly collimated beam with a strong cut-off in light intensity. Said factor F may be in the range between 0.4 and 0.75. Said factor F may alternatively be between 0.5 and 0.8.

As a result of this condition the plurality of lighting devices 621, 622, 623 that are spaced apart on the elongated axis 602 will render a non-uniform (non-homogenous, dappled) light distribution on the target surface 601, with darker zones on the target surface 601 in between the adjacent lighting devices.

Namely, the lighting system according to the invention will render zones with maximum light intensity close to where the main optical axis 627 of each lighting device 621, 622, 623 intersects the target surface 603, and render zones with minimum light intensity on the target surface 601 in between said adjacent lighting devices 621, 622, 623.

Still referring to the embodiment of the lighting arrangement 600, as depicted in FIG. 4, the luminaire 610 of the lighting arrangement 600 renders a lux level of 20 lux on the target surface 601, while the lighting system 620 of the lighting arrangement 600 additionally renders a plurality of light beams 626 and associated light intensity spots on the target surface 601. Here, the light beams each render 200 lux on the target surface 601.

Hence, the first lighting system 620 is configured to generate a light intensity profile 603 on the target surface 601. The light intensity profile 603 is generated along a line parallel to the elongated axis 601. The light intensity profile 603 comprises a repetitive distribution of a local maximum 604 in light intensity between two local minima 605 in light intensity. According to the invention, the light intensity of the two local minima 605 is at most 10% of the light intensity of the local maximum 604. Here, the local maximum in light intensity is 220 lux at the target surface 601. The two local minima in light intensity are 20 lux on the target surface 601.

As a result, the lighting arrangement 600 according to the present invention provides a non-uniform light distribution on the target surface 601, with high intensity light spots and lower intensity zones therebetween, and with a minimum lux level on the target surface. This provides individual chickens of the flock of chicken the opportunity to exhibit a preference (for ambient conditions), and thereby improve animal welfare.

Albeit optionally, not depicted in FIG. 4, the lighting arrangement may further comprise a second lighting system similar to the first lighting system. The second lighting system may mutatis mutandis comprise a plurality of lighting devices arranged on an elongated axis. The first lighting system and the second lighting system may be powered and/or controlled separately, or may be powered and/or controlled via a same power line and/or control line. The elongated axis of the first lighting system and the elongated axis of the second lighting system may be parallel, and having a pitch length (P) therebetween. Alternatively, elongated axis of the first lighting system and the elongated axis of the second lighting system may be perpendicular to one another or at an angle (A) from one another.

Albeit optionally, not depicted in FIG. 4, the lighting arrangement may further comprise a plurality of nutrient dispensers configured to release a nutrient to the flock of birds. The nutrient dispenser may for example be a feeding trough or water nipple. The nutrient plurality of dispensers may be arranged parallel to the elongated axis of the first lighting system. Yet even further, albeit optionally, a respective nutrient dispenser of the plurality of nutrient dispensers is arranged respectively between the adjacent lighting devices of the first lighting system. For example, a respective nutrient dispenser of the plurality of nutrient dispensers may be arranged respectively at the center of the spacing (S) between the adjacent lighting devices of the first lighting system. For example, a respective nutrient dispenser of the plurality of nutrient dispensers may be arranged respectively within a length (L) from (the optical axis of the respective) lighting device of the adjacent lighting devices of the first lighting system, wherein said length L is equal to a quarter of the spacing (S).

Figure 5:
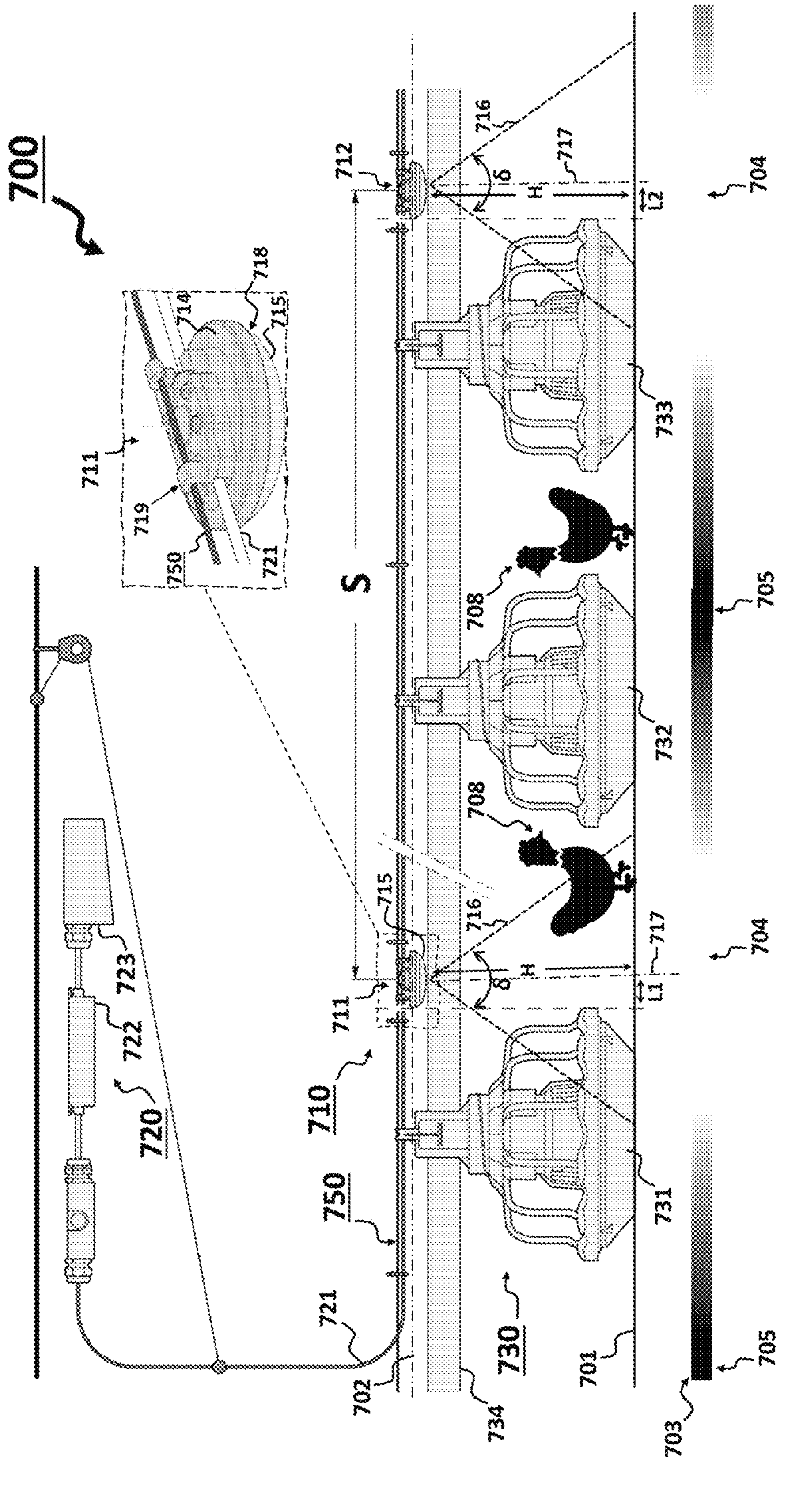
FIG. 5 depicts schematically an embodiment of a lighting arrangement according to the invention.

FIG. 5 depicts schematically, by non-limiting example, an embodiment of a lighting arrangement 700 according to the invention. The lighting arrangement 700 is installed in an agricultural environment. The agricultural environment may for example be an indoor agricultural environment, such as a poultry barn or poultry farm.

The lighting arrangement 700 is configured to illuminate a target surface 701, and in particular a flock of birds 708 on the target surface 701 in the agricultural environment. Said flock of birds may be a flock of chicken. The lighting arrangement 700 comprises a first lighting system 710, a plurality of nutrient dispensers 730, and a support line 750.

The first lighting system 710 comprises a plurality of lighting devices 711, 712 spaced apart on an elongated axis 702. Namely, the first lighting system 710 comprises a first lighting device 711 and a second lighting device 712 spaced apart along said elongated axis 702. first lighting device 711 is thereby adjacent to the second lighting device 712. The first lighting device 711 and the second lighting device 712 are spaced apart with a spacing S. Here said spacing S is 240 centimeters. Said spacing may alternatively be between 50 centimeter and 400 centimeters. Said plurality of lighting devices may alternatively be any other plural number of lighting devices.

In the present embodiment, albeit not necessary, the first lighting device 711 and the second lighting device 712 are the same. Each lighting device 711, 712 comprises a mechanical connector 719. The mechanical connector 719 of the first lighting device connects the first lighting device 711 to the support line 750. The mechanical connector of the second lighting device connects the second lighting device 712 to the support line 750.

Referring to FIG. 5, the plurality of nutrient dispensers 730 are arranged parallel to the elongated axis 702. The plurality of nutrient dispensers 730 comprise a first feeding pan 731, a second feeding pan 732, and a third feeding pan 733. The plurality of nutrient dispensers may alternatively be any other number of nutrient dispensers. Yet alternatively, in some examples, the lighting arrangement may comprise at least one nutrient dispenser.

Each respective nutrient dispenser 731, 732, 733 (i.e. the feeding pans) of the plurality of nutrient dispensers 730 is arranged substantially between the adjacent lighting devices 711, 712 of the first lighting system 710. For example, the first feeding pan 731 may be arranged within a length L1 (or: distance) from the first lighting device 711. Said distance L1 may for example be equal to at most a quarter of the spacing S. For example, the third feeding pan 733 may be arranged at a length L2 from the second lighting device 712. Said distance L2 may for example be equal to at most a fifth of the spacing S.

Alternatively, a feeding pan may be arranged at the center of the spacing between adjacent lighting devices. Alternatively phrased, a nutrient dispenser (or: a circumference of a nutrient dispenser) may be arranged within a length (or: distance) from one of the adjacent lighting devices of the lighting system, wherein said length is at most a quarter of the spacing S.

The feeding pans 731, 732, 733, as depicted in FIG. 5, are interconnected via a feeding line 734. The feeding line 734 is substantially parallel to the elongated axis 702. The feedline conveys feed to the plurality of nutrient dispensers 730. The feeding line 734 may for example comprise a screw to convey and replenish feed of the feeding pans 731, 732, 733 in operation and at e.g. predetermined times. Said feeding pans may alternatively be phrased as a feeding troughs.

Alternatively or additionally, said plurality of nutrient dispensers may comprise water nipples, or watering stations.

Still referring to FIG. 5, in the present embodiment, the support line 750 is a shocker wire. The support line 750 is also arranged substantially parallel to the elongated axis 702. In the present embodiment, the shocker wire 750 is arranged above the feeding line 734. The shocker wire 750 prevents birds to sit on top of the feedline 734. Each lighting device 711, 712 of the plurality of lighting devices—which are the same in the present embodiment—comprises the above-mentioned mechanical connector 719. Here, the plurality of lighting devices 711, 712 are mechanically connected to the support line 750 via said mechanical connector 719.

Alternatively, the support line be any other line established in the agricultural environment suitable for mechanically connecting a plurality of lighting devices, such as for example a watering line, a feeding line, a power line.

Albeit optionally, in the present embodiment, the support line 750 (i.e. the shocker wire) is adjustable in height relative to the target surface 701 in a direction perpendicular to the target surface 701. For example, the shocker wire is configured to be adjusted from a first height to a second height relative to the target surface based on the growth stage of the flock of birds 708. Namely, while the birds grow larger with each successive growth stage, the support line (i.e. the shocker wire) may increase in height (proportional to the size of the birds). This also means that the plurality of lighting devices 710 will also be adjustable in height relative to the target surface 701 in a direction perpendicular to the target surface 701. Albeit optionally, the same may apply to the plurality of nutrient dispensers 730 that are interconnected via the feeding line 734, which may also be adjustable in height. Namely, it may be common that a feeding line and associated feeding pans (and/or drinking nipples) increase in height (relative to the flooring, i.e. the target surface) as the birds grow in size.

Still referring to FIG. 5, each lighting device 711, 712 comprises a connector 719 for electrically connecting the lighting device 711, 712 to the power line 721. The power line 721 conveys power to the lighting devices 711. 712, and optionally control commands via a wired communication protocol. Here, the plurality of lighting devices 711, 712 are interconnected to the same power line 721. The power line 721 may optionally be part of the lighting arrangement as well. Hence, in alternative aspects, the lighting arrangement may comprise the power line. Yet alternatively, the plurality of lighting devices may be mechanically and electrically connected to the power line.

Still referring to FIG. 5, each lighting device 711, 712 of the plurality of lighting devices 710—which are the same in the present embodiment—further comprises at least one solid-state light source (not depicted) and a housing 714. The housing 714 comprises a light exit window 715. The at least one solid-state light source (not depicted) is arranged (or: housed) within the housing 714. The at least one solid-state light source may for example be a LED light source, such as an array of LEDs.

The at least one solid-state light source is powered with the power conveyed via the power line 721. The at least one solid-state light source emits light source light in operation. Each respective lighting device 711, 712 shapes the light source light into a light beam 716 and emits the light beam 716 along a main optical axis 717 via the light exit window 715 onto the target surface 701. The main optical axis 717 is directed in the gravitational direction (downwards).

The power line 721 connects to a control module 720. The control module 720 comprises a driver 722 and a controller 723. The driver 722 provides power, which is conveyed via the power line 721 to the lighting devices 711, 712. The controller 723 is configured to control the driver 722, and/or control the lighting devices 711, 712 by conveying control commands via the power line 721. The driver 722 may for example be controlled such that the lighting devices 711, 712 are turned on, off, or dimmed.

In additional or alternative aspects, the controller may for example comprise a memory storing a lighting schedule, or a processor obtaining such a lighting schedule, wherein the controller is configured to control the lighting devices according to the lighting schedule. For example, the lighting schedule may define the light intensity and/or light color and/or correlated color temperature that at least one of the plurality of lighting devices should output (by controlling the light source light emitted by the at least one solid-state light source in the respective lighting device). The lighting schedule may be predefined. The controller may comprise a user input interface for receiving a user input indicative of said lighting schedule, such that the lighting schedule may be obtained via said user input interface.

Yet alternatively, each lighting device of the plurality of lighting devices may comprise a local controller configured to control a light intensity, a Correlated Color Temperature (CCT) and/or a spectral distribution of the light source light of the respective lighting device. each lighting device of the plurality of lighting devices may comprise a communication unit for wireless communication, wherein the communication unit is configured to wirelessly receive control commands for controlling the at least one solid-state light source of the respective lighting device. The communication unit is thereby in wireless communication with the controller—for example via a known wireless modality such as Wi-Fi, Bluetooth, ZigBee, Lo-Ra, LTE, Matter, Thread, VLC, IR, radiofrequency, etc. Hence, the local controller is configured to obtain said control command for controlling the at least one solid-state light source of the respective lighting device, wherein the local controller is configured to control a light intensity, a Correlated Color Temperature (CCT) and/or a spectral distribution of the light source light of the respective lighting device based on said control command.

Still referring to FIG. 5, as mentioned before, the first lighting device 711 and the second lighting device 712 are adjacent and spaced apart with a spacing S. In the present embodiment the spacing S is 240 centimeters. Furthermore, the light exit windows 715 of the adjacent lighting devices 711, 712 are arranged at a distance H from the target surface 701. Furthermore, each respective light beam 716 of the adjacent lighting devices 711, 712 has an angular light distribution with a Full Width Half Maximum (FWHM). The Full Width Half Maximum is denoted with Greek letter δ.

In the present embodiment, said distance H is 50 centimeters. Because the support line 750 (i.e. shocker wire) is adjustable in height relative to the target surface 701, said distance H may also be adjustable relative to the target surface 701 in a direction perpendicular to the target surface 701. However, in the present embodiment, said distance H is at most 100 centimeters.

Still referring to FIG. 5, the first lighting system 100 is further characterized in that the plurality of lighting devices 711, 712 are arranged such that their Full Width Half Maximum (FWHM or beam angle denoted with δ, meets the condition of $$FWHM < F * 2 * \tan^{-1}\left(\frac{S}{2H}\right).$$

Thereby, F is a factor in the range between 0.1 (A TENTH) and 1 (ONE). The variable S is said spacing. The variable H is said distance from the target surface 601.

In the present embodiment, said factor F is set to 0.8. Considering the above-mentioned spacing S of 240 centimeters and a distance H of 50 centimeters, the FWHM becomes 108 degrees. Hence, each lighting device 711, 712 of the plurality of lighting devices 710 comprises a FWHM (or beam angle θ) below 108 degrees.

Similarly, said factor F may alternatively be set to a value between 0.1 and 1. For example, said factor F may be in the range between 0.1 and 0.3. This will render a highly collimated beam with a strong cut-off in light intensity. Said factor F may be in the range between 0.4 and 0.75. Said factor F may alternatively be between 0.5 and 0.8.

As a result of this condition the plurality of lighting devices 710 that are spaced apart on the elongated axis 702 will render a non-uniform (non-homogenous, dappled) light distribution on the target surface 701, with darker zones on the target surface 701 in between the adjacent lighting devices 711, 712. The first lighting system according to the invention will render zones with maximum light intensity close to where the main optical axis 717 of each lighting device 711, 712 intersects the target surface 701, and render zones with minimum light intensity on the target surface 701 in between said adjacent lighting devices 711, 712.

Namely, still referring to FIG. 5, the first lighting system 620 is configured to generate a light intensity profile 703 on the target surface 701. The light intensity profile 703 is generated along a line parallel to the elongated axis 701. The light intensity profile 703 comprises a repetitive distribution of a local maximum 704 in light intensity between two local minima 705 in light intensity. According to the invention, the light intensity of the two local minima 705 is at most 10% of the light intensity of the local maximum 704. Here, the local maximum in light intensity is 150 lux at the target surface 701. The two local minima in light intensity are 5 lux on the target surface 701. Said lux values may be envisioned differently.

As a result, the lighting arrangement 700 according to the present invention provides a non-uniform light distribution on the target surface 701, with high intensity light spots and lower intensity zones therebetween, and with a minimum lux level on the target surface. This provides individual chickens of the flock of chicken 708 the opportunity to exhibit a preference (for ambient conditions), and thereby improve animal welfare.

Hence, the light intensity profile 703 as caused by the spaced apart plurality of lighting devices 711, 712 enriches the birds 708 environment, and stimulates their cognitive behavior, because the birds 708 are provided with a possibility to explore different ambient conditions and express a preference. For example, the flock of chicken 708 may exhibit their preference whether to feed at the feeding pans 730 in bright light as caused by the local maximum 704 or to feed at the feeding pans 730 in dimmed light as caused by the local minima 705. At the same time, due to the distance H being at most 100 centimeters, light spillage is reduced, and energy efficiency is improved. It is for example found that the first lighting system of the lighting arrangement according to the present invention renders up to 80% of energy savings compared to modem LED lighting systems mounted at a ceiling of a poultry farm.

Because the support line 750 (i.e. shocker wire) is adjustable in height relative to the target surface 701, said distance H may also be adjustable relative to the target surface 701 in a direction perpendicular to the target surface 701. Hence, the lighting system 710 is configured to adjust—this can be automatically, gradually, or continuously—the position of the plurality of lighting devices 711, 712 relative to the target surface 701 in a direction perpendicular to the target surface 701. More specifically, albeit optionally, and not necessarily, the distance H is adjustable from a first distance (H1) to a second distance (H2). The distance H may for example be adjustable from a first distance (H1) during a first stage of a growth cycle of the flock of birds to a second distance (H2) at a second stage of a growth cycle of the flock of birds. The second distance (H2) is thereby larger than the first distance (H1), and the second stage of the growth cycle of the flock of birds is later in time than the first stage of the growth cycle of the flock of birds. Albeit optionally, each lighting device may further comprise an optical element configured to shape said light source light along the main optical axis, when moved from the first distance (H2) to the second distance (H2), into respectively a first light beam when at the first distance (H1) and a second light beam when at the second distance (H2), wherein a footprint of the first light beam on the target surface and a footprint of the second light beam on the target surface remains the same. Yet in further examples, each lighting device may comprise an optical element configured to shape said light source light along the main optical axis into the light beam. For example, the optical element may comprise a collimator and/or a lens, wherein the collimator and/or the lens is configured to collimate said light source light along the main optical axis into the light beam. The optical element may for example comprise adaptive optics configured to manually and/or automatically adapting the Full Width Half Maximum of the respective light beam.

In an embodiment, not depicted, the lighting arrangement as depicted in FIG. 5 further comprises a second lighting system, which is similar to the first lighting system, and a second plurality of nutrient dispensers. The second lighting system comprises mutatis mutandis a plurality of lighting devices spaced apart along a second elongated axis. The second elongated axis is parallel to the elongated axis of the first lighting system. The second plurality of nutrient dispensers are drinking nipples arranged along a line parallel to the elongated axis. The second lighting system is arranged to illuminate the target surface along said line of the second plurality of nutrient dispensers (i.e. drinking nipples).

Still referring to FIG. 5, albeit optionally, the light exit window 715 comprises a contour 718 in a plane parallel to the elongated axis. The contour comprises a geometric centre (not depicted). The main optical axis 717 intersects with said geometric centre. Namely, the geometric center corresponds to the point where the main optical axis 117 intersects said plane. The at least one solid-state light source (not depicted) comprises a first array of solid-state light sources (e.g. LEDs) and a second array of solid-state light sources (e.g. LEDs). These arrays may be located on a same PCB, or a same metal core, or a same chip. The first array and second array of solid-state light sources are arranged concentrically around said geometric center and opposite to one another. Moreover, the first array of solid-state light sources and the second array of solid-state light sources are arranged closer to said contour than the geometric center. This may optimize the light distribution of the emitted light beam on the target surface because the lighting device is arranged above the feeding line 734. Hence, while the feeding line 734 may at least partly obtrude the light beam, the arrangement of the at least one solid-state light source (i.e. the first array and second array of solid-state light sources as mentioned) is such that the beam of light 716 optimally illuminates parts directly beneath said feeding line 734. Hence, the lighting device according to the invention can also be advantageously positioned above a feeding line. Other arrangements of solid-state light sources within the lighting device may be envisioned similarly. For example, the light exit window according to the invention may shape the light source light into a batwing-shaped light beam.

Figure 6:
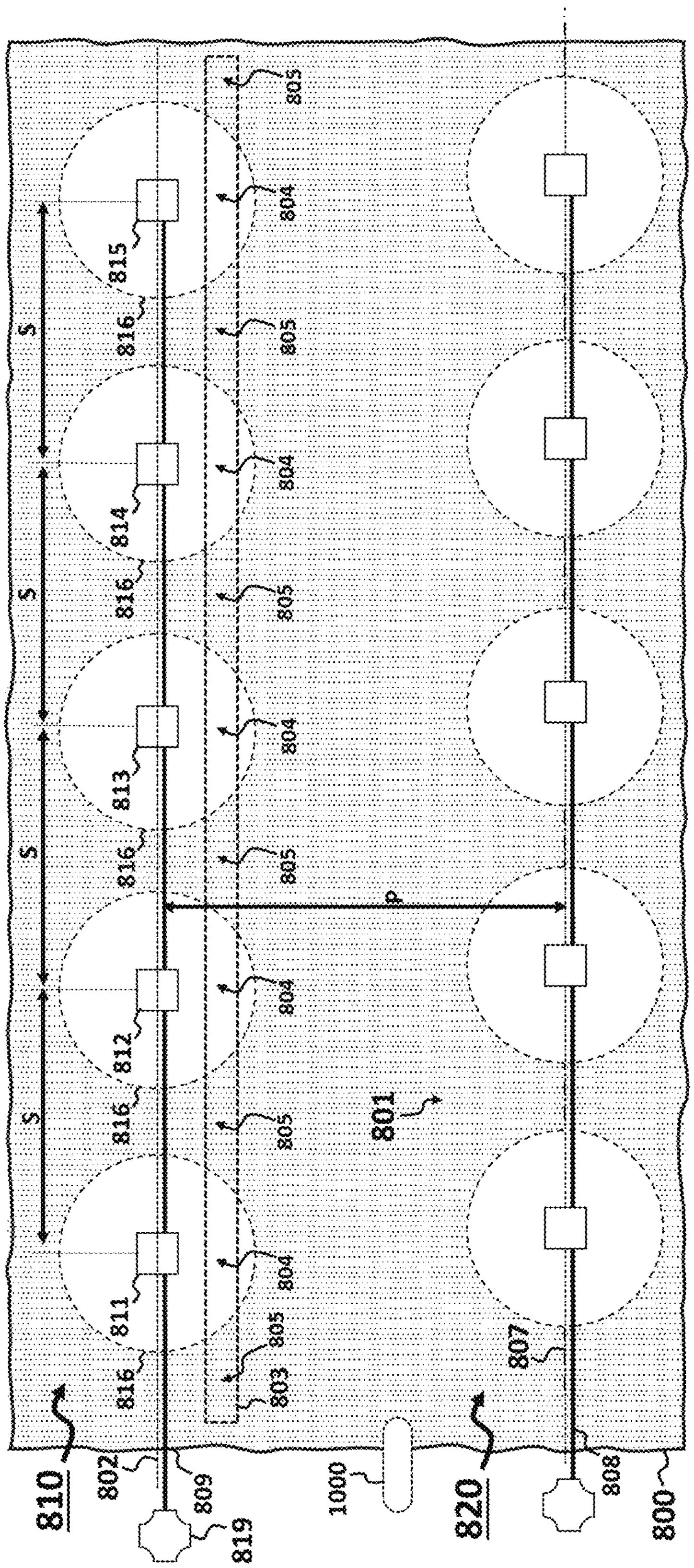
FIG. 6 depicts schematically an embodiment of a first lighting system and a second lighting system in an agricultural environment according to the invention.

FIG. 6 depicts schematically, by non-limiting example, a top view of an embodiment of a first lighting system 810 and a second lighting system 820 according to the invention. The first lighting system 810 and the second lighting system 820 are arranged within an agricultural environment 800 and are adapted to illuminate a target surface 801 (i.e. e.g. a floor) of said agricultural environment 800.

The agricultural environment 800 is an indoor agricultural environment. The agricultural environment is arranged for rearing and/or housing a flock of birds. Said flock of birds may for example be chicken and/or turkeys. The agricultural environment 800 may for example be: a poultry house, a poultry barn, a poultry farm, a poultry coop, a poultry stable. The agricultural environment comprises the target surface 801. Said target surface 801 may for example be a floor, a bedding, a platform of the agricultural environment 800.

The first lighting system 810 comprises a plurality of lighting devices 811, 812, 813, 814, 815 spaced apart on (or: along) a first elongated axis 802 with a spacing S, and connected to a first power line 809. Here, the spacing S is 150 centimeters, but may alternatively be a value between 50 centimeters and 400 centimeters.

The second lighting system 820 is identical to the first lighting system, but for the second lighting system 820 being arranged on (or: along) a second elongated axis 807, and connected to a second power line 808. Albeit optionally, the second elongated axis 807 is thereby parallel to the first elongated axis 802, and at a pitch length P thereof. For example, said pitch length P may be at least 80 centimeters. The first power line and the second power line are separate in the depicted embodiment of FIG. 6, but may alternatively be the same power line.

Said pitch P may in alternative embodiments be at least 1 meter, or preferably at least 2 meters, such that also a dimmed zone may be established between the illumination of the first lighting system and the illumination of the second lighting system.

Hence, since the second lighting system 820 and the first lighting system 810 are identical, but for the above-mentioned aspects, the properties of the first lighting system 810 apply mutatis mutandis to the second lighting system 820, but for their location within the agricultural environment 600.

Here, the first lighting system 810 comprises five lighting devices, namely a first lighting device 811, a second lighting device 812, a third lighting device 813, a fourth lighting device 814, and a fifth lighting device 815. Alternatively, the first lighting system any comprise any other integer number of lighting devices, such as at least ten lighting devices or at least twenty lighting devices.

Considering the first lighting system 810: The first lighting device 811 is adjacent to the second lighting device 812. The third lighting device 813 is adjacent to the second lighting device 812 and the fourth lighting device 814. The fourth lighting device 814 is adjacent to the third lighting device 813 and the fifth lighting device 815. The fifth lighting device 815 is adjacent to the fourth lighting device 814.

Still referring to FIG. 6, each lighting device 811, 812, 813, 814, 815 of the first lighting system 810 comprises a connector (not depicted) for electrically connecting the respective lighting device to the first power line 809. The first power line 809 is configured to power said lighting devices 811, 812, 813, 814, 815 of the first lighting system 810. Hence, the lighting devices 811, 812, 813, 814, 815 of the first lighting system 810 are interconnected on the power line 809. For example, the lighting devices 811, 812, 813, 814, 815 of the first lighting system 810 may be daisy chained.

The lighting devices of the second lighting system 820 are mutatis mutandis connected to the second power line 808.

Each lighting device 811, 812, 813, 814, 815 of the first lighting system 810 further comprises a mechanical connector (not depicted) for mechanically connecting the respective lighting device to a support line. In the present embodiment, the power line 809 is also the support line. Hence, the mechanical connector and the electrical connector may be the same. The respective lighting device may for example be crimped onto the power line, thereby establishing both a mechanical as well as electrical connection. Alternatively, the respective lighting device may be crimped onto the power line with the (electrical) connector, and be mounted further onto the power line with a separate mechanical connector. Such examples may be beneficial for providing strain relieve to the electrical connection.

Yet alternatively, each respective lighting device may comprise a mechanical connector configured to mount the lighting device to a feedline within the agricultural environment. Hence, the present invention also provides examples wherein the lighting devices according to the invention are adapted to be arranged on a feeding line within an agricultural environment.

Still referring to FIG. 6, each lighting device 811, 812, 813, 814, 815 of the first lighting system 810 comprises a respective solid-state light source (not depicted) configured to emit light source light having a certain light spectrum and/or light intensity. The respective solid-state light source may for example be an array of LED light sources.

In the present embodiment, the at least one solid-state light source of the first lighting device comprises a first LED array with cold white and/or warm white LEDs.

Additionally or alternatively, the at least one solid-state light source may comprise a LED array with ultraviolet LEDs, and/or with colored LEDs (such as Red, Green, Blue, Amber). As a result, the emitted light source light may comprise white light and/or ultraviolet light and/or colored light. For example, said ultraviolet light may comprise at least one dominant peak wavelength in the wavelength range between 315-380 nm (UVA) and/or between 280-315 nm (UVB) and/or between 200-315 nm (UVC), such as for example 222 nm.

Alternatively, in an embodiment, a lighting device of the plurality of lighting devices of the first lighting system may comprise at least one solid-state light source that is different from the solid-state light sources of the other lighting devices of the plurality of lighting devices. The emitted light source light may consequently be different as well. Hence, only one lighting device of the plurality of lighting devices comprises a solid-state light source configured to emit a different light source light. For example, the third lighting device may emit a higher intensity (infra)red light with at least one dominant peak wavelength within the wavelength range between 625-1000 nm. Such an embodiment may render even more environmental enrichment. Other spectra of light may be envisioned similarly, as long as at least one light source of the plurality of light sources has a different of light source light (characteristic) emitted in operation.

Still referring to the embodiment depicted in FIG. 6, albeit optionally, the first lighting system 810 comprises a controller 819 configured to power and to control the plurality of lighting devices 811, 812, 813, 814, 815. Hence, the controller 819 may comprise a driver for providing power to the power line 809 in operation. The controller 819 may comprise a communication unit to communicate with said lighting devices 811, 812, 813, 814, 815 via a wired connection, with a known wired communication protocol such as ethernet, DALI, PLC, Coded Mains, DMX, etc. The lighting devices 811, 812, 813, 814, 815 of the first lighting system may thereby optionally comprise a communication unit for receiving control commands from the controller 819 and a local controller configured to obtain said control commands and control their respective at least one light source based on said control commands. Said control commands may be lighting control commands. For example, said control commands may be lighting control commands configured to control one of a light intensity, a correlated color temperature, modulation, and/or color of the light source light.

Alternatively, the controller may be in wireless communication with the plurality of lighting devices of the first lighting system. Namely, each of the lighting devices of the first lighting system comprises a local controller and a communication unit configured to receive control commands wirelessly from the controller and a local controller configured to obtain the control commands and control the respective at least one solid-state light source of the respective lighting device based on said control command.

Yet alternatively, in examples, the plurality of lighting devices of the first lighting system may communicate with each other via a wired communication network. And, only one of the lighting devices of the first lighting system (i.e. a master lighting device) comprises such a communication unit configured to receive commands wirelessly from the controller and a local controller configured to control the respective at least one solid-state light source of the respective lighting device and control the solid-state light sources of the other lighting devices of the first lighting system based on said control command. Different control architectures may be envisioned similarly.

Still referring to the embodiment depicted in FIG. 6, each lighting device 811, 812, 813, 814, 815 of the first lighting system 810 further comprises a respective housing (not depicted). Each respective housing comprises a light exit window. The light exit window of each lighting device 811, 812, 813, 814, 815 of the first lighting system 810 is arranged at a distance H from the target surface 801. Here, the distance H from the target surface 801 is 85 centimeters, but may alternatively be any other distance between 30 centimeters and 150 centimeters. The distance H may in preferred examples be at most 100 centimeters.

Each lighting device 811, 812, 813, 814, 815 of the first lighting system 810 is configured to shape the light source light into a light beam 816, and configured to emit the light beam 816 along a main optical axis (not depicted) via the light exit window (not depicted) onto the target surface 801. Each respective light beam 816 of the adjacent lighting devices (as mentioned above) has an angular light distribution with a Full Width Half Maximum (FWHM).

In alternative examples, not depicted, a lighting device of the first lighting system may emit the light beam to only one side of the first elongated axis. Therefore, the light exit window may comprise an optical element, such as for example a mask, reflector, or filter. Yet alternatively, the at least one solid-state light source may comprise an array of individually controllable LED light sources, that may be controlled on or off so as to render a light beam that only illuminates one side of the first elongated axis.

Still referring to FIG. 6, according to the present invention, each respective light beam 816 has an angular light distribution with a Full Width Half Maximum that meets the criteria that $$FWHM < F * 2 * \tan^{-1}\left(\frac{S}{2H}\right).$$

Therein: the FWHM is said Full Width Half Maximum (FWHM); and S is said spacing S1; and H is said distance; and F is a factor in the range between 0.1 and 1.

In the present embodiment, said factor F is set to 1. Considering the above-mentioned spacing S1 of 150 centimeters and distance H of 85 centimeters, the FWHM becomes 83 degrees. Hence, each lighting device 811, 812, 813, 814, 815 of the first lighting system 810 comprises a FWHM (or beam angle) below 83 degrees.

Similarly, said factor F may alternatively be set to a value between 0.1 and 1. For example, said factor F may be 0.5. This will render a collimated beam with a strong cut-off in light intensity. In such a case—with F=0.5—each lighting of the first lighting system will comprises a FWHM (or beam angle) below 41 degrees.

As a result of this, the first lighting system 810 with the plurality of lighting devices 811, 812, 813, 814, 815 that are spaced apart on the first elongated axis 802 will render a non-uniform (non-homogenous, dappled) light distribution on the target surface 801, with darker zones on the target surface 801 in between the adjacent lighting devices. Namely, still referring to FIG. 6, the first lighting system 810 is configured to generate a light intensity profile 803 on the target surface 801. The light intensity profile 803 is generated along a line parallel to the first elongated axis 802. The light intensity profile 803 comprises a repetitive distribution of a local maximum 804 in light intensity between two local minima 805 in light intensity. According to the invention, the light intensity of the two local minima 805 is at most 10% of the light intensity of the local maximum 804. For example, at most 5%. Here, the local maximum 804 in light intensity is 200 lux at the target surface 801. The two local minima in light intensity are at most 20 lux on the target surface 801. Said lux values may be envisioned differently. Said 'at most 20 lux' on the target surface 801 may for example be provided, optionally, by at least one luminaire 1000 illuminating the agricultural environment 800 and target surface 801 with ambient (background) illumination. In some embodiments, such a luminaire 1000 may be part of a lighting arrangement together with the first lighting system 810.

All in all, the light intensity profile 803 caused by the spaced apart plurality of lighting devices 811, 812, 813, 814, 815 of the first lighting system 810 enriches the birds environment, and stimulates their cognitive behavior. The non-uniform or dappled light distribution on the target surface 801 enables the birds to explore different ambient conditions and express a preference. This improves animal welfare. At the same time, due to the distance H being at most 100 centimeters, and 85 centimeters in the present embodiment, light spillage is reduced, and energy efficiency is improved. It is for example found that the first lighting system of the lighting arrangement according to the present invention renders up to 80% of energy savings compared to modern LED lighting systems mounted at a ceiling of a poultry farm.

Still referring to FIG. 6, albeit optionally, the first lighting system 810 may be controlled independently from the second lighting system 820. Hence, first lighting system and the second lighting system may be powered alternately in time, or controlled to turn on alternately in time. For example the first lighting system 810 may be controlled at a first moment in time (T1), and the second lighting system 820 may be controlled at a second moment in time (T2), and the first lighting system and the second lighting system may be controlled simultaneously at a third moment in time (T3). Such control options may enrich the agricultural environment 600 even further. Said first moment in time (T1) may for example be during a feeding phase of the flock of birds, whereas the second moment in time (T2) may for example be during a subsequent drinking phase of the flock of birds. It may also serve to guide the birds from a first line of gradient lighting along the first elongated axis 802 to a second line of gradient lighting along the second elongated axis 807.

Figure 7:
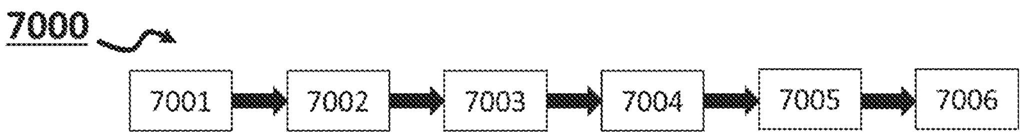
FIG. 7 depicts schematically an embodiment of a method according to the invention.

FIG. 7 depicts schematically, by non-limiting example, a method 7000 of illuminating a target surface in an agricultural environment for a flock of birds. The method 7000 according to the invention is performed by a lighting system and/or lighting arrangement according to the invention—for example as depicted in FIGS. 1-6.

Hence, as partly mentioned before, the lighting system comprises a plurality of lighting devices, wherein each lighting device comprises: a connector for electrically connecting the lighting device to a power line; a housing comprising a light exit window; at least one solid-state light source arranged within the housing, wherein the at least one solid-state light source is configured to emit light source light; wherein each respective light beam of the adjacent lighting devices has an angular light distribution with a Full Width Half Maximum (FWHM).

The method comprises the step 7001 of electrically connecting the lighting devices to a power line, and the step 7002 of the method comprises: mechanically connecting the lighting devices to a support line.

The method 7000 comprises a further step 7003 of spacing apart adjacent lighting devices of the plurality of lighting devices on an elongated axis with a spacing (S). The method comprises a step 7004 of arranging the light exit windows of the adjacent lighting devices at a distance (H) from the target surface. The method comprises a step 7005 of each one of the adjacent lighting devices shaping the light source light into a light beam and emitting the light beam along a main optical axis via the light exit window onto the target surface; wherein $$FWHM < F * 2 * \tan^{-1}\left(\frac{S}{2H}\right);$$

wherein FWHM is said Full Width Half Maximum (FWHM); wherein S is said spacing (S); wherein H is said distance (H); and wherein F is a factor in the range between 0.1 and 1. The method comprises the step 7006 of generating a light intensity profile on the target surface along a line parallel to the elongated axis; wherein said light intensity profile comprises a repetitive distribution of a local maximum in light intensity between two local minima in light intensity. For example, the light intensity of the two local minima is at most 10% of the light intensity of the local maximum.

Figure 8:
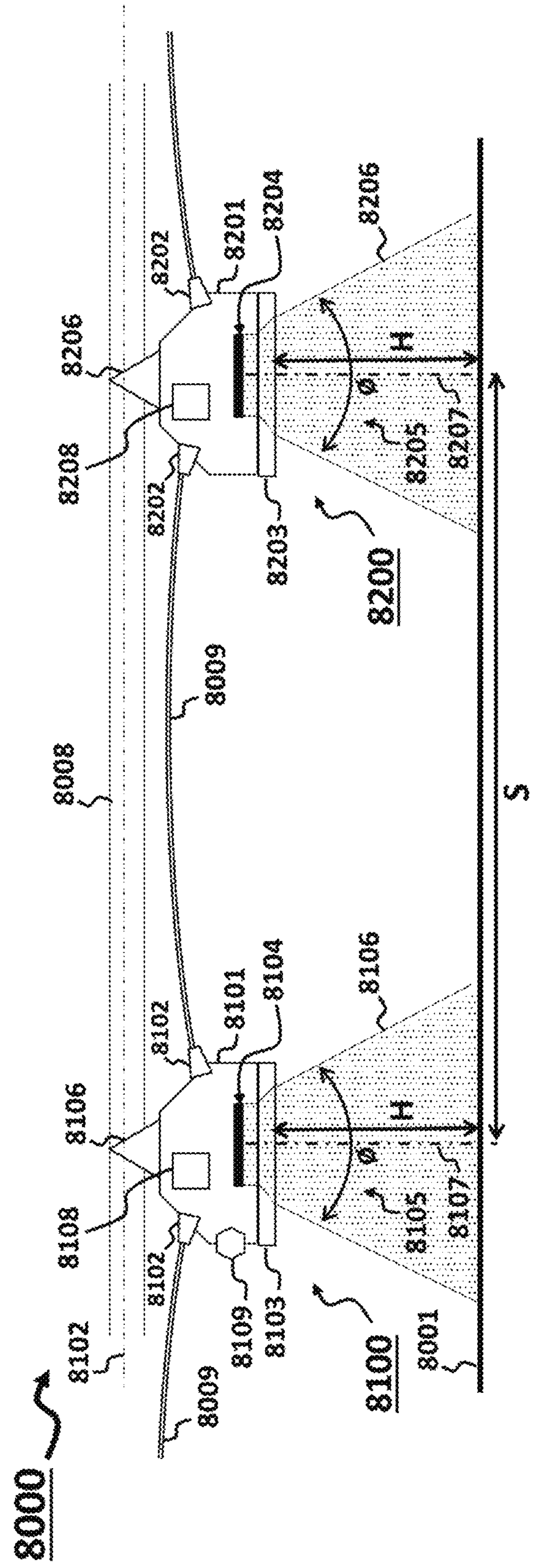
FIG. 8 depicts schematically an embodiment of a lighting system according to the invention.

FIG. 8 depicts schematically, by non-limiting example, a lighting system 8000 according to the invention, and depicts a first lighting device 8100 and a second lighting device 8200 according to the invention. The lighting system 8000 is configured to illuminate a target surface 8001 in an agricultural environment suitable for (rearing) a flock of birds.

The lighting system 8000 comprises the first lighting device 8100 and a second lighting device 8200 spaced apart on an elongated axis 8001. The first lighting 8100 and the second lighting device 8200 are adjacent (on the elongated axis 8001) and are spaced apart device with a spacing S. Here, said spacing S is 100 centimetres.

The first lighting device 8100 and the second lighting device 8200 are interconnected on a power line 8009. The connector 8102 of the first lighting device 8100 connects the first lighting device 8100 to the power line 8009. Similarly, the connector 8202 of the second lighting device 8200 connects the second lighting device 8200 to the same power line 8009. Said connectors 8102, 8202 may for example crimp the respective lighting device 8100, 8200 onto the power line 8009.

The first lighting device 8100 and the second lighting device 8200 are both mechanically connected to a same support line 8008. Albeit optionally, the support line 8008 is adjustable in height relative to the target surface 8001. Here, the support line 8008 is a feedline configured to convey feed within an agricultural environment. For example, such a feedline may be a tube with an internal screw. Hence, the first lighting device 8100 comprises a mechanical connector 8106 to connect the first lighting device 8100 to the feedline (i.e. the tube). Similarly, the second lighting device 8200 comprises a mechanical connector 8206 to connect the second lighting device 8200 to the same feedline (i.e. the tube). Alternatively, said lighting devices may be magnetically connected to the support line, wherein the support line is a metallic support line. Alternatively, said lighting devices may be adhesively connected to the support line. The support line may alternatively be a wire spun within the agricultural environment, such as a shocker wire. Yet alternatively, the support line may be the same as the power line. Hence, the lighting devices may be connected electrically and/or mechanically to the power line.

The first lighting device 8100 further comprises a housing 8101 comprising a light exit window 8103 and at least one solid-state light source 8104. The at least one solid-state light source 8104 is configured to emit light source light 8105 in operation. Here, the at least one solid-state light source 8104 may for example be an array of (different) LED light sources, such as different color LED light sources. The LED light sources of the array of LED light sources may optionally be individually addressable and/or controllable.

The first lighting device 8100 is further configured to shape the light source light 8105 into a light beam 8106, and configured to emit the light beam 8106 along a main optical axis 8107 via the light exit window 8104 onto the target surface 8001. The light exit window 8104 of the first lighting device 8100 is arranged at a distance H from the target surface 8001.

Here, said distance H is 75 centimeters at a first moment in time (T1). Since the first and second lighting devices 8100, 8200 are both connected to the feedline 8008, which is adjustable in height e.g. during the growth cycle of the flock of birds, the distance H may be adjusted similarly as well. Said distance H may for example be (at most) 100 centimeters at a second moment in time (T2).

Irrespective of being spaced apart on the elongated axis 8102, the first lighting device 8100 and the second lighting device 8200 are identical. Namely, the second lighting device 8200 also comprises a housing 8201 comprising a light exit window 8203 and at least one solid-state light source 8204. The at least one solid-state light source 8204 of the second lighting device 8200 is configured to emit light source light 8205 in operation. The second lighting device 8200 is further configured to shape the light source light 8205 into a light beam 8206, and configured to emit the light beam 8206 along a main optical axis 8207 via the light exit window 8204 onto the target surface 8001.

The light exit windows 8104, 8204 of the first lighting device 8100 and the adjacent second lighting device 8200 are arranged at a distance H from the target surface 8001.

Here, said distance H is 75 centimeters at a first moment in time (T1). Since the first and second lighting devices 8100, 8200 are both connected to the feedline 8008, which is adjustable in height e.g. during the growth cycle of the flock of birds, the distance H may be adjusted similarly as well. Said distance H may for example be (at most) 100 centimeters at a second moment in time (T2).

The light beam 8106 of the first lighting device 8100 and the light beam 8206 of the second lighting device 8200 have an angular light distribution with a Full Width Half Maximum (FWHM) that meets the condition:

$$FWHM < F * 2 * \tan^{-1}\left(\frac{S}{2H}\right).$$

The FWHM is the Full Width Half Maximum, also denoted with Greek letter ø in FIG. 8; S is said spacing; H is said distance; and F is a factor in the range between 0.1 (A TENTH) and 1 (ONE).

In the present embodiment, said factor F is set to 0.8. Considering the above-mentioned spacing S of 100 centimeters and a distance H of 75 centimeters, the FWHM becomes 54 degrees.

Still referring to FIG. 8, the first lighting device 8100 comprises a local processor 8108 and a sensor 8109. The second lighting device 8200 also comprises a local processor 8208, but for illustrative reasons not a sensor. Alternatively, all lighting devices of the lighting system may comprise a sensor.

Albeit optionally, said local processor 8108, 8208 comprises a wireless communication unit configured to communicate wirelessly with a controller (not depicted). The controller may transmit a control command configured to control the respective at least one solid-state light source 8104, 8204 (i.e. the array of LED light sources) of the first lighting device 8100 and/or the second lighting device 8200. The local processor obtains such a control command and is configured to control the respective at least one solid-state light source 8104, 8204 based on said control command. Alternatively, the communication unit may be configured for wired communication, for example via the powerline or a separate data line.

The first lighting device 8100 further comprises the sensor 8109. The sensor 8109 is configured to detect (or: determine) a (sensor) signal indicative of a bird-related parameter of the flock of birds and/or a flock-related parameter of the flock of birds and/or an ambient condition. The processor 8108 of the first lighting device 8100 may obtain said signal and control the at least one solid-state light source 8104 of the first lighting device 8100 based on said (sensor) signal. For example, the sensor may be a temperature sensor, a light sensor, a presence sensor, a PIR sensor, a thermopile array, a VOC sensor, a Time-of-Flight sensor, a camera, an accelerometer, a pressure sensor, a radiofrequency sensing sensor, a LIDAR, etc. Yet even further, the processor 8109 of the first lighting device 8100 may cause the wireless communication unit of the first lighting device 8100 to transmit a control command to the second lighting device 8100 based on said (sensor) signal of the sensor 8109. This enables group control within the lighting system 8000 without all lighting devices requiring a sensor.

Still referring to FIG. 8, the at least one solid-state light source 8104 (i.e. array of LED light sources) of the first lighting device 8100 is configured to emit light source light 8105 with a first lighting characteristic at e.g. a first time (t1) and with a second lighting characteristic at e.g. a second time (t2). The first lighting characteristic comprises for example ultraviolet light. The first time may for example be a dark (i.e. night) period within a circadian cycle of the growth cycle (or: schedule) of the flock of birds. The second lighting characteristic may for example be white light. The second time may for example be a light (i.e. day) period within a circadian cycle of the growth cycle (or: schedule) of the flock of birds.

Still referring to FIG. 8, similarly, the at least one solid-state light source 8204 (i.e. array of LED light sources) of the second lighting device 8100 is configured to emit light source light 8205 with a first lighting characteristic at a first time (t1) and with a second lighting characteristic at a second time (t2). The first lighting characteristic comprises for example infrared light. Thus, the second lighting device 8200 may emit a different light source light 8205 than the light source light 8105 of the first lighting device 8100 at a certain time. This may enrich the agricultural environment even further, and render more health and wellbeing for the flock of birds. Infrared light may for example warm the chicken. The second lighting characteristic may for example be blue light having at least one dominant peak wavelength within the wavelength range between 380-500 nm.

In embodiments, not depicted, the first lighting device and the second lighting device may be turned on alternately or subsequently. Hence, during a first time period the first lighting device may emit a respective light beam comprising the light source light of the first lighting device; and at a subsequent second time period the second lighting device may emit a respective light beam comprising the light source light of the second lighting device. The second time period may be later than the first time period. The first time period and the second time period may have equal time durations. As a result, a light beam gradually moves along the elongated axis and when emitted illuminates the target surface with a moving light beam. Furthermore, as the first lighting device and the second lighting device, and other plurality of lighting devices of the lighting system may be controlled individually, according to the invention, the amount of surface area of the target area that is illuminated may be controlled. Also certain gradients in light intensity may be established.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting system for illuminating a target surface in an agricultural environment for a flock of birds, wherein the lighting system comprises a plurality of lighting devices spaced apart on an elongated axis, wherein each lighting device comprises:

a connector for electrically connecting the lighting device to a power line;

a housing comprising a light exit window;

at least one solid-state light source arranged within the housing, wherein the at least one solid-state light source is configured to emit light source light;

wherein each lighting device is configured to shape the light source light into a light beam, and configured to emit the light beam along a main optical axis via the light exit window onto the target surface;

wherein adjacent lighting devices of the plurality of lighting devices are spaced apart with a spacing(S); and wherein the light exit windows of the adjacent lighting devices are arranged at a distance (H) from the target surface;

wherein each respective light beam of the adjacent lighting devices has an angular light distribution with a Full Width Half Maximum (FWHM);

wherein $$FWHM < F * 2 * \tan^{-1}\left(\frac{S}{2H}\right).$$

wherein FWHM is said Full Width Half Maximum (FWHM);
wherein S is said spacing(S);
wherein H is said distance (H); and
wherein F is a factor in the range between 0.1 and 1.

2. The lighting system according to claim 1, wherein the factor (F) is in the range between 0.1 and 0.8.

3. The lighting system according to claim 2, wherein the factor (F) is in the range between 0.4 and 0.75.

4. The lighting system according to claim 1, wherein said spacing(S) is at least 50 centimetres and at most 400 centimetres.

5. The lighting system according to claim 1, wherein said distance (H) is at most 1 meter.

6. The lighting system according to claim 1, wherein said distance (H) may be adjustable from a first distance (H1) to a second distance (H2) in a direction perpendicular to the target surface.

7. The lighting system according to claim 1, wherein the lighting system is configured to generate a light intensity profile on the target surface along a line parallel to the elongated axis;

wherein said light intensity profile comprises a repetitive distribution of a local maximum in light intensity between two local minima in light intensity;

wherein the light intensity of the two local minima is at most 10% of the light intensity of the local maximum.

8. The lighting system according to claim 1, wherein each lighting device of the plurality of lighting devices comprises a local controller and a communication unit;

wherein the communication unit is configured to receive a control command for controlling the at least one solid-state light source of the respective lighting device;

wherein the local controller is configured to obtain said control command and to control a light intensity, a Correlated Color Temperature (CCT) and/or a spectral distribution of the light source light of the respective lighting device based on said control command.

9. The lighting system according to claim 1, wherein the emitted light source light comprises ultraviolet light;

wherein the ultraviolet light comprises at least one dominant peak wavelength in the wavelength range between 315-380 nm, and/or ultraviolet light with at least one dominant peak wavelength in the wavelength range between 280-315 nm.

10. The lighting system according to claim 1, wherein the emitted light source light comprises at least one dominant peak wavelength within the wavelength range between 450-480 nm and a dominant peak at a wavelength range between 515-545 nm.

11. The lighting system according to claim 1, wherein the light exit window of each respective lighting device comprises a contour in a plane parallel to the elongated axis, wherein the contour comprises a geometric centre;

wherein the at least one solid-state light source comprises a first array of solid-state light sources and a second array of solid-state light sources;

wherein first array of solid-state light sources and the second array of solid-state light sources are arranged around said geometric centre;

wherein the first array of solid-state light sources is arranged opposite to the second array of solid-state light sources;

wherein the first array of solid-state light sources and the second array of solid-state light sources are arranged closer to said contour than to the geometric centre.

12. A lighting arrangement for illuminating a target surface in an agricultural environment for a flock of birds, wherein the lighting arrangement comprises:

(i) a first lighting system according to claim 1;

wherein the first lighting system is configured to generate a light intensity profile on the target surface along a line parallel to the elongated axis;

wherein said light intensity profile comprises a repetitive distribution of a local maximum in light intensity between two local minima in light intensity;

wherein the light intensity of the two local minima is at most 10% of the light intensity of the local maximum;

(ii) at least one luminaire for illuminating the target surface in the agricultural environment with luminaire light in operation, wherein said luminaire light renders a lux level of least 20 lux on the target surface; and (iii) a plurality of nutrient dispensers configured to release a nutrient to the flock of birds, wherein the plurality of nutrient dispensers is arranged substantially parallel to the elongated axis of the first lighting system, wherein a respective nutrient dispenser of the plurality of nutrient dispensers is arranged respectively between the adjacent lighting devices of the first lighting system.

13. The lighting arrangement according to claim 12, wherein the lighting arrangement comprises: (iv) a height adjustable support line;

wherein each lighting device of the first lighting system comprises a mechanical connector for mechanically connecting the lighting device to the support line;

wherein the position of the plurality of lighting devices relative to the target surface is adjustable in a direction perpendicular to the target surface;

wherein the support line is one of: a shocker wire, a feedline, a powerline.

14. The lighting arrangement according to claim 12, wherein the lighting arrangement comprises: (v) a second lighting system wherein the second lighting system is configured to generate a light intensity profile on the target surface along a line parallel to the elongated axis;

wherein said light intensity profile comprises a repetitive distribution of a local maximum in light intensity between two local minima in light intensity;

wherein the light intensity of the two local minima is at most 10% of the light intensity of the local maximum;

wherein the first lighting system and the second lighting system are controlled separately.

15. A method of illuminating a target surface in an agricultural environment for a flock of birds, performed by a lighting system comprising a plurality of lighting devices, wherein each lighting device comprises:

a connector for electrically connecting the lighting device to a power line;

a housing comprising a light exit window;

at least one solid-state light source arranged within the housing, wherein the at least one solid-state light source is configured to emit light source light;

wherein each respective light beam of the adjacent lighting devices has an angular light distribution with a Full Width Half Maximum (FWHM);

wherein the method comprises:

electrically connecting the plurality of lighting devices to a power line;

mechanically connecting the plurality of lighting devices to a support line;

spacing apart adjacent lighting devices of the plurality of lighting devices on an elongated axis with a spacing(S);

arranging the light exit windows of the adjacent lighting devices at a distance (H) from the target surface each one of the adjacent lighting devices shaping the light source light into a light beam and emitting the light beam along a main optical axis via the light exit window onto the target surface;

wherein $$FWHM < F*2*\tan^{-1}\left(\frac{S}{2H}\right);$$

wherein FWHM is said Full Width Half Maximum (FWHM);

wherein S is said spacing(S);

wherein H is said distance (H); and wherein F is a factor in the range between 0.1 and 1;

wherein the method further comprises:

generating a light intensity profile on the target surface along a line parallel to the elongated axis; wherein said light intensity profile comprises a repetitive distribution of a local maximum in light intensity between two local minima in light intensity; wherein the light intensity of the two local minima is at most 10% of the light intensity of the local maximum.

16. The lighting system according to claim 1, wherein at least one of the plurality of lighting devices comprises an optical element configured to shape the light source light into the light beam.

17. The lighting system according to claim 16, wherein the optical element comprises a collimator and/or a lens.

18. The lighting system according to claim 16, wherein the optical element comprises adaptive optics configured to adapt the FWHM of the light beam.

* * * * *